US011579753B2

(12) United States Patent
Lee et al.

(10) Patent No.: US 11,579,753 B2
(45) Date of Patent: Feb. 14, 2023

(54) ELECTRONIC DEVICE, METHOD, AND COMPUTER-READABLE MEDIUM FOR PROVIDING SPLIT SCREEN

(71) Applicant: Samsung Electronics Co., Ltd., Suwon-si (KR)

(72) Inventors: Sangeun Lee, Suwon-si (KR); Dasom Kim, Suwon-si (KR); Sangki Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/451,305

(22) Filed: Oct. 18, 2021

(65) Prior Publication Data
US 2022/0035494 A1  Feb. 3, 2022

Related U.S. Application Data

(63) Continuation of application No. PCT/KR2020/005146, filed on Apr. 17, 2020.

(30) Foreign Application Priority Data

Apr. 18, 2019 (KR) .................. 10-2019-0045765

(51) Int. Cl.
*G06F 3/0482* (2013.01)
*G06F 3/0486* (2013.01)
*G06F 3/0488* (2022.01)

(52) U.S. Cl.
CPC .......... *G06F 3/0482* (2013.01); *G06F 3/0486* (2013.01); *G06F 3/0488* (2013.01); *G06F 2203/04803* (2013.01)

(58) Field of Classification Search
CPC .... G06F 3/0482; G06F 3/0486; G06F 3/0488; G06F 3/14; G06F 3/1431;
(Continued)

(56) References Cited

U.S. PATENT DOCUMENTS 10,209,858 B2    2/2019  Yook et al.
2011/0175930 A1*  7/2011  Hwang ................. G06F 3/0481
                                                             345/660
(Continued)

FOREIGN PATENT DOCUMENTS

KR    10-2014-0073372 A    6/2014
KR    10-2014-0112988 A    9/2014
(Continued)

OTHER PUBLICATIONS

International Search Report and Written Opinion of the International Searching Authority dated Aug. 6, 2020 in connection with International Application No. PCT/KR2020/005146, 10 pages.

*Primary Examiner* — Jennifer N Welch
*Assistant Examiner* — Ashley M Fortino

(57) ABSTRACT

An electronic device according to various embodiments comprises at least one memory for storing instructions and a foldable display, and is operably coupled with the foldable display and the at least one memory, wherein the electronic device, when executing instructions, may display a first screen in a first region of the foldable display, including a first sub-region and a second sub-region adjacent to the first sub-region while the foldable display is in an unfolded state, receive a first drag input from an edge region in the first region away from an edge in the first region that corresponds to the edge region while displaying the first screen in the first region, and in response to receiving the first drag input, display a list partially superimposed on the first screen, and including at least one executable object for indicating some of applications that have been executed in the second sub-region.

20 Claims, 20 Drawing Sheets

(58) Field of Classification Search
CPC ............ G06F 2203/04803; G06F 1/16; G06F 1/1641; G06F 2203/04804; G06F 2203/04806
See application file for complete search history.

(56) References Cited

U.S. PATENT DOCUMENTS

| | | | |
|---|---|---|---|
| 2013/0346912 A1* | 12/2013 | Buening | G06F 3/0482 |
| | | | 715/783 |
| 2014/0164991 A1* | 6/2014 | Kim | G06F 3/0486 |
| | | | 715/788 |
| 2014/0351722 A1 | 11/2014 | Frederickson et al. | |
| 2014/0351748 A1 | 11/2014 | Xia et al. | |
| 2016/0026381 A1* | 1/2016 | Kim | G06F 3/0482 |
| | | | 715/761 |
| 2016/0110093 A1 | 4/2016 | S et al. | |
| 2016/0259528 A1* | 9/2016 | Foss | G06T 11/001 |
| 2016/0351168 A1* | 12/2016 | Yan | G06F 9/451 |
| 2018/0052571 A1 | 2/2018 | Seol et al. | |
| 2019/0065240 A1* | 2/2019 | Kong | G06F 3/04886 |
| 2020/0027425 A1 | 1/2020 | Lee et al. | |
| 2020/0133482 A1 | 4/2020 | Kim et al. | |
| 2021/0089207 A1 | 3/2021 | Kim et al. | |
| 2021/0160355 A1* | 5/2021 | Min | G06F 9/50 |

FOREIGN PATENT DOCUMENTS

| | | |
|---|---|---|
| KR | 10-2015-0012234 A | 2/2015 |
| KR | 10-2016-0046727 A | 4/2016 |
| KR | 10-2018-0019392 A | 2/2018 |
| KR | 10-2020-0008804 A | 1/2020 |
| KR | 10-2020-0047162 A | 5/2020 |

\* cited by examiner

ELECTRONIC DEVICE, METHOD, AND COMPUTER-READABLE MEDIUM FOR PROVIDING SPLIT SCREEN

CROSS-REFERENCE TO RELATED APPLICATIONS

This application is a Bypass Continuation of International Application No. PCT/KR2020/005146, filed Apr. 17, 2020, which claims priority to Korean Patent Application No. 10-2019-0045765, filed Apr. 18, 2019, the disclosures of which are herein incorporated by reference in their entirety.

BACKGROUND

1. Field

Various embodiments to be described below relate to an electronic device, a method, and a computer-readable medium for providing a split screen.

2. Description of Related Art

Electronic devices for easily accessing multimedia content are being developed. Such electronic devices may provide multimedia content using a display of the electronic device.

SUMMARY

In order to enhance the portability of devices such as phablets and tablets, which have a display larger than those of smartphones, electronic devices including a deformable display such as a foldable display are being developed. Accordingly, a solution for simultaneously providing a variety of information may be required for an electronic device having a deformable display.

The problems to be solved in this document are not limited to the technical problems mentioned above, and other technical problems that are not mentioned above will be clearly understood by those of ordinary skill in the art to which the disclosure pertains from the description below.

An electronic device according to various embodiments may include at least one memory configured to store instructions, a foldable display, and at least one processor operably coupled with the foldable display and the at least one memory, and configured, when executing the instructions, to display a first screen in a first region of the foldable display, the first screen including a first sub-region and a second sub-region adjacent to the first sub-region while the foldable display is in an unfolded state, receive a first drag input from an edge region in the first region away from an edge in the first region that corresponds to the edge region while displaying the first screen in the first region, display a list partially superimposed on the first screen displayed in the first region in response to receiving the first drag input, the list including at least one executable object for indicating some of the applications that have been executed in the second sub-region, and, in response to receiving an input for selecting a first executable object from among the at least one executable object included in the list, display the first screen in the first sub-region and display an execution screen of an application indicated by the selected first executable object in the second sub-region, wherein an area of the first sub-region may be greater than an area of the second sub-region.

According to various embodiment, an execution method in an electronic device having a foldable display may include displaying a first screen in a first region of the foldable display, the first screen including a first sub-region and a second sub-region adjacent to the first sub-region while the foldable display is in an unfolded state, receiving a first drag input from an edge region in the first region away from an edge in the first region that corresponds to the edge region while displaying the first screen in the first region, displaying, in response to receiving the first drag input, a list partially superimposed on the first screen displayed in the first region, the list including at least one executable object for indicating some of the applications that have been executed in the second sub-region, and, in response to receiving an input for selecting a first executable object from among the at least one executable object included in the list, displaying the first screen in the first sub-region and displaying an execution screen of an application indicated by the selected first executable object in the second sub-region, wherein an area of the first sub-region may be greater than an area of the second sub-region A non-transitory computer-readable storage medium according to various embodiments may store one or more programs including instructions that cause, when executed by one or more processors of an electronic device having a foldable display, the electronic device to display a first screen in a first region of the foldable display, the first screen including a first sub-region and a second sub-region adjacent to the first sub-region while the foldable display is in an unfolded state, receive a first drag input from an edge region in the first region away from an edge in the first region that corresponds to the edge region while displaying the first screen in the first region, display a list partially superimposed on the first screen displayed in the first region in response to receiving the first drag input, the list including at least one executable object for indicating some of the applications that have been executed in the second sub-region, and, in response to receiving an input for selecting a first executable object from among the at least one executable object included in the list, display the first screen in the first sub-region and display an execution screen of an application indicated by the selected first executable object in the second sub-region.

An electronic device and a method thereof according to various embodiments can provide an improved user experience by providing a split screen.

The effects obtainable in the disclosure are not limited to the above-mentioned effects, and other effects that are not mentioned will be clearly understood by those of ordinary skill in the art to which the disclosure pertains from the description below.

DETAILED DESCRIPTION

Figure 1A:
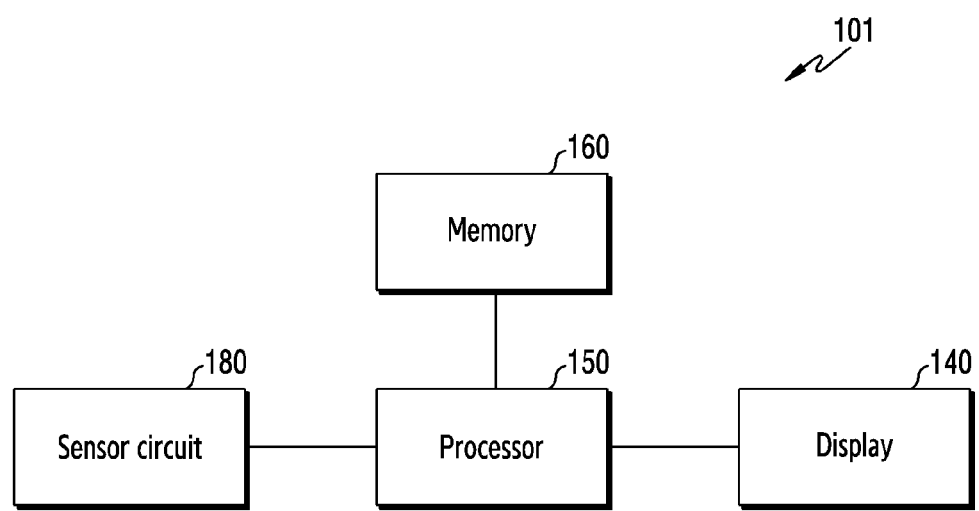
FIG. 1A is a simplified block diagram of an electronic device according to various embodiments.

Hereinafter, various embodiments of the present invention will be described with reference to accompanying drawings. However, various embodiments of the present invention are not limited to specific embodiments, and it should be understood that modification, equivalent, and/or alternative on the various embodiments described herein can be variously made. With regard to description of drawings, similar components may be marked by similar reference numerals.

In the disclosure disclosed herein, the expressions "have," "may have," "include" and "comprise," or "may include" and "may comprise" used herein indicate existence of corresponding features (for example, elements such as numeric values, functions, operations, or components) and do not preclude the presence of additional features.

In the disclosure disclosed herein, the expressions "A or B," "at least one of A or/and B," or "one or more of A or/and B," and the like used herein may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used herein, may refer to various elements of various embodiments of the present invention, but do not limit the elements. For example, such terms do not limit the order and/or priority of the elements. Furthermore, such terms may be used to distinguish one element from another element. For example, "a first user device" and "a second user device" indicate different user devices regardless of the order or priority. For example, without departing from the scope of the present invention, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to another element or coupled with/to or connected to another element via an intervening element (for example, a third element). In contrast, when an element (for example, a first element) is referred to as being "directly coupled with/to" or "directly connected to" another element (for example, a second element), it should be understood that there is no intervening element (for example, a third element).

According to the situation, the expression "configured to (or set to)" used herein may be used as, for example, the expression "suitable for," "having the capacity to," "designed to," "adapted to," "made to," or "capable of". The term "configured to (or set to)" must not mean only "specifically designed to" in hardware. Instead, the expression "a device configured to" may mean that the device is capable of operating together with another device or other components. For example, a "processor configured to (or set to) perform A, B, and C" may mean a dedicated processor (for example, an embedded processor) for performing a corresponding operation or a generic—purpose processor (for example, a central processing unit (CPU) or an application processor) which may perform corresponding operations by executing one or more software programs which are stored in a memory device.

Terms used in the present invention are used to describe specified embodiments of the present invention and are not intended to limit the scope of other embodiments. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal way, unless expressly so defined herein in various embodiments of the present invention. In some cases, even if terms are terms which are defined in the specification, they may not be interpreted to exclude embodiments of the present invention.

An electronic device according to the present dis closure may be a device including a communication function. For example, the electronic device may include at least one of a Smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g. a head—mounted device, such as electronic glasses, electronic clothes, an electronic bracelet, an electronic necklace, an electronic appcessory, electronic tattoos, or a smartwatch).

The electronic device may also be a smart home appliance with a communication function such as a television, a digital versatile disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

The electronic device may also include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM), and a point of sale (POS) device.

The electronic device may also include at least one of a part of furniture or a building/structure, an electronic board, an electronic signature receiving device, a projector, and various kinds of measuring instruments (e.g., a water meter, an electric meter, a gas meter, and a radio wave meter). Further, the electronic device may be a flexible device. The electronic device may also be a combination of one or more of the aforementioned various devices. Further, it will be apparent to those skilled in the art that the electronic device, according to the present disclosure, is not limited to the aforementioned devices.

In this document, the term "user" may indicate a person who uses an electronic device or a device (e.g., an artificial intelligence electronic device) using an electronic device.

Hereinafter, various embodiments will be described in detail with reference to the accompanying drawings. However, the sizes of elements may be exaggerated or reduced in the drawings for convenience of description. For example, since the size and thickness of each element are arbitrarily given in the drawings for convenience of description, the disclosure is not necessarily limited to the drawings.

FIG. 1A is a simplified block diagram of an electronic device according to various embodiments.

Referring to FIG. 1A, the electronic device 101 may include a processor 150, a memory 160, a display 140, and a sensor circuit 180.

The processor 150 may control the overall operation of the electronic device 101. For example, the processor 150 may execute applications that provide advertisements, the Internet, games, videos, and the like. In various embodiments, the processor 150 may include a single core or multiple cores. For example, the processor 150 may include a multi-core such as a dual-core, a quad-core, a hexa-core, and the like. According to embodiments, the processor 150 may further include a cache memory that is positioned inside or outside the same.

The processor 150 may receive commands from other elements of the electronic device 101, interpret the received commands, and perform calculations or process data according to the interpreted commands.

The processor 120 may process data or signals that are produced or generated in the application. For example, the processor 150 may request commands, data, or signals from the memory 160 in order to execute or control the application. The processor 150 may record (or store) or update commands, data, or signals in the memory 160 in order to execute or control the application.

The processor 150 may interpret and process messages, data, commands, or signals received from the memory 160, the display 140, or the sensor circuit 180. The processor 150 may produce new messages, data, commands, or signals, based on the received messages, data, commands, or signals. The processor 150 may provide the processed or produced messages, data, commands, or signals to the memory 160, the display 140, or the sensor circuit 180.

The entirety or a part of the processor 150 may be electrically or operably coupled with or connected to other elements (e.g., the memory 160, the display 140, or the sensor circuit 180) in the electronic device 101.

According to embodiments, the processor 150 may be configured with one or more processors. For example, the processor 150 may include one or more of an AP (application processor) for controlling upper layer programs such as application programs and the like, a GPU (graphic processing unit) for controlling the display 140, or a CP (communication processor) for controlling communication functions.

The memory 160 may store commands for controlling the electronic device 101, control command code, control data, or user data. For example, the memory 160 may include applications, an OS (operating system), middleware, and a device driver.

The memory 160 may include one or more of volatile memory or non-volatile memory. The volatile memory may include DRAM (dynamic random access memory), SRAM (static RAM), SDRAM (synchronous DRAM), PRAM (phase-change RAM), MRAM (magnetic RAM), RRAM (resistive RAM), FeRAM (ferroelectric RAM), and the like. The non-volatile memory may include ROM (read only memory), PROM (programmable ROM), EPROM (electrically programmable ROM), EEPROM (electrically erasable programmable ROM), flash memory, and the like.

The memory 160 may include a non-volatile medium such as a hard disk drive (HDD), a solid state disk (SSD), an eMMC (embedded multimedia card), and a UFS (universal flash storage).

The display 140 may output content, data, or signals. In various embodiments, the display 140 may display image data that is processed by the processor 150.

According to embodiments, the display 140 may be combined with a plurality of touch sensors (not shown) capable of receiving touch inputs or the like to be configured with an integrated touch screen. In the case where the display 140 is configured with the touch screen, the plurality of touch sensors may be disposed on the display 140, or may be disposed under the display 140.

According to embodiments, the display 140 may include a deformable display. For example, the display 140 may be configured as the display (e.g., a foldable display) in which at least a portion of the display 140 is foldable. In the case where the display 140 is configured as the foldable display, the electronic device 101 may have a structure in which the display 140 is foldable.

Figure 1B:
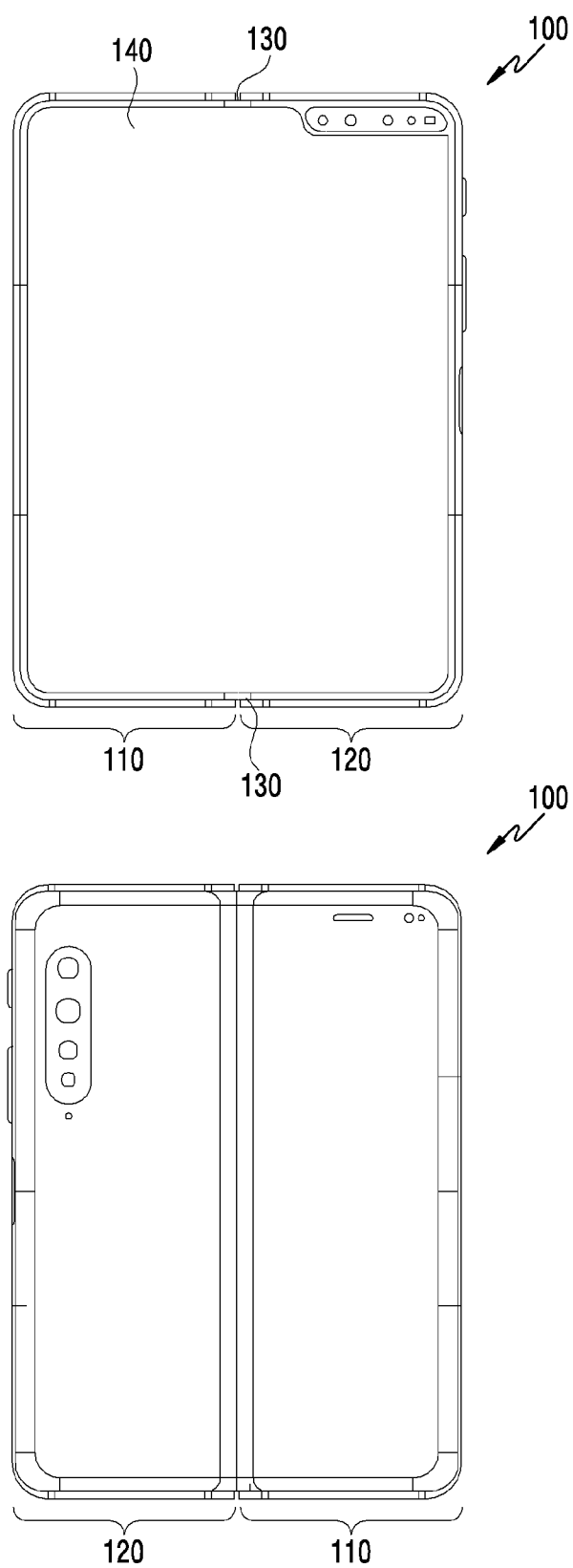
FIG. 1B illustrates an example of a front view and a rear view of a foldable electronic device in an unfolded state according to various embodiments.

For example, referring to FIG. 1B, the electronic device 101 may include a first housing 110, a second housing 120, a folding portion 130, and/or a display 140.

In various embodiments, the first housing 110 may include a first surface and a second surface facing away from the first surface. In various embodiments, the second housing 120 may include a third surface and a fourth surface facing away from the third surface.

In various embodiments, the first housing 110 and the second housing 120 may be connected by the folding portion 130. For example, the folding portion 130 may be coupled with the side surface of the first housing 110 and the side surface of the second housing 120 facing the side surface of the first housing 110, respectively, to be configured to pivotably or rotatably connect between the first housing 110 and the second housing 120.

The display 140 may be disposed on the first housing 110 and the second housing 120 across the folding portion 130. In various embodiments, the display 140 may be installed to be supported by the first housing 110 and the second housing 120. In various embodiments, the display 140 may be disposed on the first surface and the third surface across the folding portion 130. In various embodiments, the display 140 may include a first region corresponding to the first surface and a second region corresponding to the third surface.

The electronic device 101 according to various embodiments may be folded about the folding portion 130. For example, the folding portion 130 may be disposed between the first housing 110 and the second housing 120 of the electronic device 101, thereby enabling the electronic device 101 to be bent, twisted, or folded. In various embodiments, the first housing 110 may be connected to the second housing 120 through the folding portion 130 so as to rotate about the folding portion 130. In various embodiments, the second housing 120 may be connected to the first housing 110 through the folding portion 130 so as to rotate about the folding portion 130. In various embodiments, the first housing 110 and the second housing 120 may rotate about the folding portion 130 to be folded so as to face each other. In various embodiments, the first housing 110 and the second housing 120 may be substantially folded against or overlap each other.

In various embodiments, the electronic device 101 may provide a first state in which the first housing 110 and the second housing 120 are folded out by the folding portion 130. In various embodiments, in the first state, the first surface may be substantially flushed with the third surface. In various embodiments, by unfolding the folding portion 130, the electronic device 101 may provide the first state in which the first housing 110 is substantially flushed with the second housing 120. In various embodiments, the first state may indicate the state in which all of a first region corresponding to the first surface among the entire area of the display 140, a second region corresponding to the third surface among the entire area of the display 140, and a third region that surrounds the folding portion 130 among the entire area of the display 140 may be provided within the user's field of view facing the front surface of the electronic device 101. In various embodiments, the first state may be referred to as an outspread state or outspreading state, or may be referred to as an unfolded state.

In various embodiments, the electronic device 101 may provide a second state in which the first housing 110 and the second housing 120 are folded in by the folding portion. In various embodiments, in the second state, the first surface may be superimposed on the third surface. In various embodiments, the electronic device 101 may provide a second state in which the folding portion 130 is folded such that the front surface (e.g., the first surface) of the first housing 110 faces the front surface (e.g., the third surface) of the second housing 120 and in which the first housing 110 and the second housing 120 are arranged in parallel. In various embodiments, the second state may indicate the state in which the display 140 is covered in the user's field of view directed to the front of the electronic device 101. In various embodiments, the second state may be referred to as a folded state or folding state.

Although FIG. 1B shows the second state in which the first surface of the first housing 110 is superimposed on the third surface of the second housing 120, this is for the convenience of description. In various embodiments, the second state, unlike that shown in FIG. 1B, may indicate the state in which the second surface of the first housing 110 is superimposed on the fourth surface of the second housing 120. In other words, the second state, unlike that shown in FIG. 1B, may indicate the state in which the first region among the entire area of the display 140 and a portion of the third region among the entire area of the display 140 are provided, or may indicate the state in which the second region among the entire area of the display 140 and a portion of the third region among the entire area of the display 140 are provided.

In various embodiments, the display 140 may be disposed on the front portion (e.g., the third surface) of the second housing 120 across the first housing 110 and the folding portion 130. The electronic device 101 according to various embodiments may be folded about the folding portion 130. Since the display 140 is disposed from the first housing 110 to the second housing 120 across the folding portion 130, the display may be bent by a folding operation of the electronic device 101. For example, in the display 140, unlike the first region disposed on the first surface of the first housing 110 and the second region disposed on the third surface of the second housing 120, the third region disposed on the folding portion 130 may be bent according to the folding operation of the electronic device 101. In various embodiments, the third region may be bent to be curved to prevent damage to the display 140.

In various embodiments, one or more of the first region and the second region may further include a curved region like the third region. For example, the end away from the center of the first housing 110 may include a region in a round shape. For another example, the end away from the center of the second housing 120 may include a region in a round shape. In various embodiments, since the curved display region included in the first region and the curved display region included in the second region are disposed at the ends of the first housing 110 and the second housing 120, respectively, it may be referred to as an edge display.

The sensor circuit 180 may include at least one of a first sensor for obtaining information on the posture of the electronic device 101 or a second sensor for obtaining information on the angle between the first housing 110 and the second housing 120 of the electronic device 101.

In various embodiments, the first sensor may include one or more of a sensor for obtaining data on a change in the linear motion of the electronic device 101, a sensor for obtaining a change in the rotational motion of the electronic device 101, or a sensor for obtaining data on the geographic position of the electronic device 101. For example, the first sensor may include one or more of a geomagnetic sensor, a gyro sensor, or an infrared sensor.

In various embodiments, the second sensor may obtain information on the angle between the first housing 110 and the second housing 120 of the electronic device 101 in order to provide information on the state (e.g., the first state and the second state) of the electronic device 101. In various embodiments, the second sensor may be included in the folding portion 130.

In various embodiments, the processor 150 may display a variety of information using the display 140. In various embodiments, the information may be displayed in at least one of the first region, the second region below the first region, and the third region above the first region. In various embodiments, the second region may include at least one executable object (e.g., an executable object for providing a backward function, an executable object for retrieving the running application, an executable object for providing a cancel function, and the like) for controlling the screen displayed in the first region. In various embodiments, at least one executable object displayed in the second region may disappear according to at least one of the type of screen displayed in the first region or the type of content provided through the screen displayed in the first region. In various embodiments, at least one executable object displayed in the second region may be maintained independently from the switching of the screen displayed in the first region or regardless of switching of the screen displayed in the first region. In various embodiments, the second region may be referred to as a control region. In various embodiments, the third region may include at least one indicator for indicating the state of the electronic device 101 (e.g., an indicator for indicating the quality of cellular communication, an indicator for indicating whether or not a Wi-Fi function is active, an indicator for indicating the remaining amount of the battery, and the like). In various embodiments, at least one indicator displayed in the third region may disappear according to at least one of the type of screen displayed in the first region or the type of content provided through the screen displayed in the first region. In various embodiments, at least one indicator displayed in the third region may be maintained independently from switching of the screen displayed in the first region or regardless of switching of the screen displayed in the first region.

Figure 2:
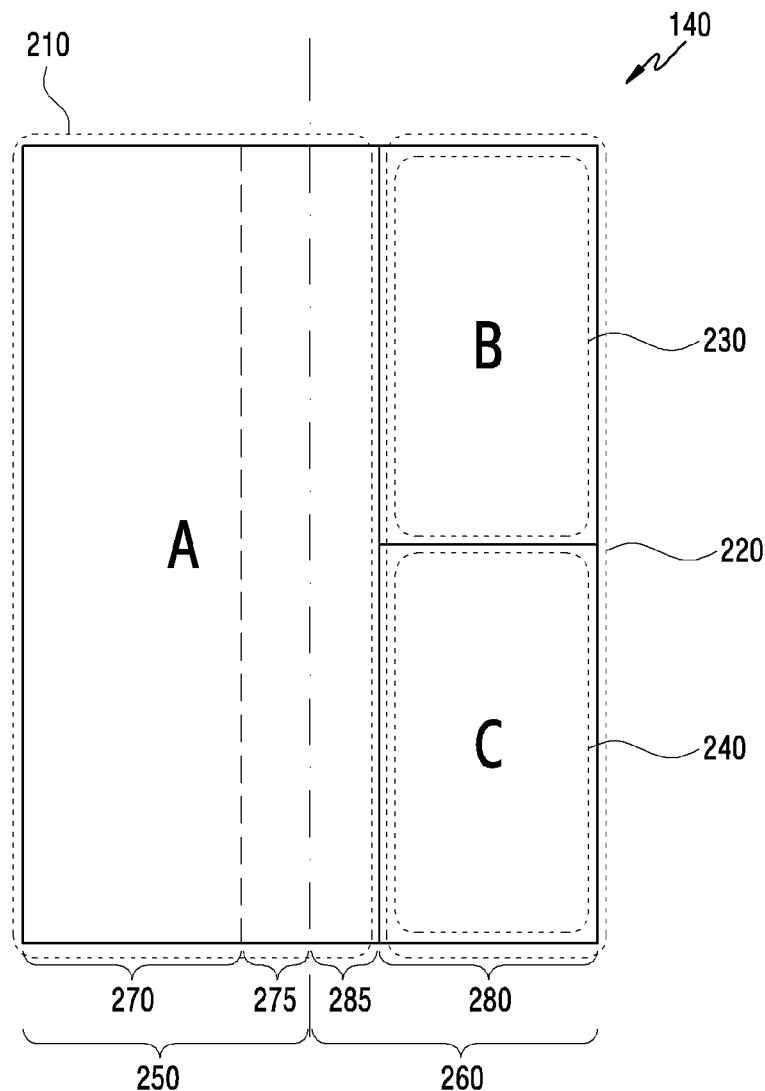
FIG. 2 illustrates a structure of a split screen displayed in an electronic device according to various embodiments.

In various embodiments, the first region may display a split screen. For example, referring to FIG. 2, the first region may be configured with a first sub-region 210 and a second sub-region 220, or include a first sub-region 210 and a second sub-region 220. In various embodiments, the second sub-region 220 may be disposed beside the first sub-region 210. In various embodiments, the area of the second sub-region 220 may be less than the area of the first sub-region 210. However, it is not limited thereto. In various embodiments, the split screen may indicate the state in which a plurality of screens is concurrently provided or in which a plurality of screens is provided together. Since the area of the first sub-region 210, defined while providing the split screen, is greater than the area of the second sub-region 220, the user may more intuitively recognize which region is a main region while providing the split screen. The electronic device 101 according to various embodiments may provide an enhanced user experience through such intuitive recognition.

As described above, in various embodiments, the area of the first sub-region 210 may be larger than the area of the second sub-region 220. In various embodiments, in terms of providing the area larger than that of the second sub-region 220, the first sub-region 210 may be referred to as a main display region.

In various embodiments, in terms of providing the area smaller than that of the first sub-region 210, the second sub-region 220 may be referred to as an auxiliary display region or an additional display region. The second sub-region 220 may provide a single screen or multiple screens according to the setting or configuration of the electronic device 101. For example, the second sub-region 220 may provide a second screen and a third screen 240 while providing the first screen in the first sub-region 210. In various embodiments, the third screen 240 may be disposed below the second screen 230.

In various embodiments, in the case where the display 140 is configured with a foldable display, the first region may be configured with a plurality of portions. For example, in the case where the display 140 is configured with a foldable display, the first region may be configured with a portion 250 corresponding to the first surface of the first housing and a portion 260 corresponding to the third surface, or include the portion 250 and the portion 260. In various embodiments, the portion 250 may include a first portion 270 on the first surface of the first housing 110 and a second portion 275 that is positioned on the first surface, beside the first portion 270, and on at least a portion of the folding portion 130, or may be configured with the first portion 270 and the second portion 275. In various embodiments, the portion 260 may include a third portion 280 on the third surface of the second housing 120 and a fourth portion 285 that is positioned on the third surface, beside the third portion 280, and on at least a portion of the folding portion 130, or may be configured with the third portion 280 and the fourth portion 285.

In various embodiments, the processor 150 may display a first screen in the entire first region. For example, the first screen may be a screen provided by an application installed in the electronic device 101. For example, referring to FIG. 3A, in a state 301, when the display 140 is in the unfolded state, the processor 150 may display a first screen A in the first region that includes the first sub-region 210 and the second sub-region 220 or is configured with a first sub-region 210 and a second sub-region 220.

In various embodiments, the processor 150 may receive a specified input while displaying the first screen in the entire first region. In various embodiments, the specified input may include an input for entering the split screen state for concurrently providing a plurality of screens on the display 140. In various embodiments, the specified input may include an input for calling a list for selecting another screen to be provided together with the first screen in the split screen state. For example, the specified input may include a drag input from an edge region in the first region toward another region in the first region, which is different from the edge region. In various embodiments, in response to receiving the specified input, the processor 120 may display the list as partially superimposed or overlaid on the first screen. For example, the list may include at least one visual object for indicating some of the applications that have been executed in the second sub-region. In certain embodiments, the drag input is away from an edge of the first region corresponding to the edge region.

Figure 3A:
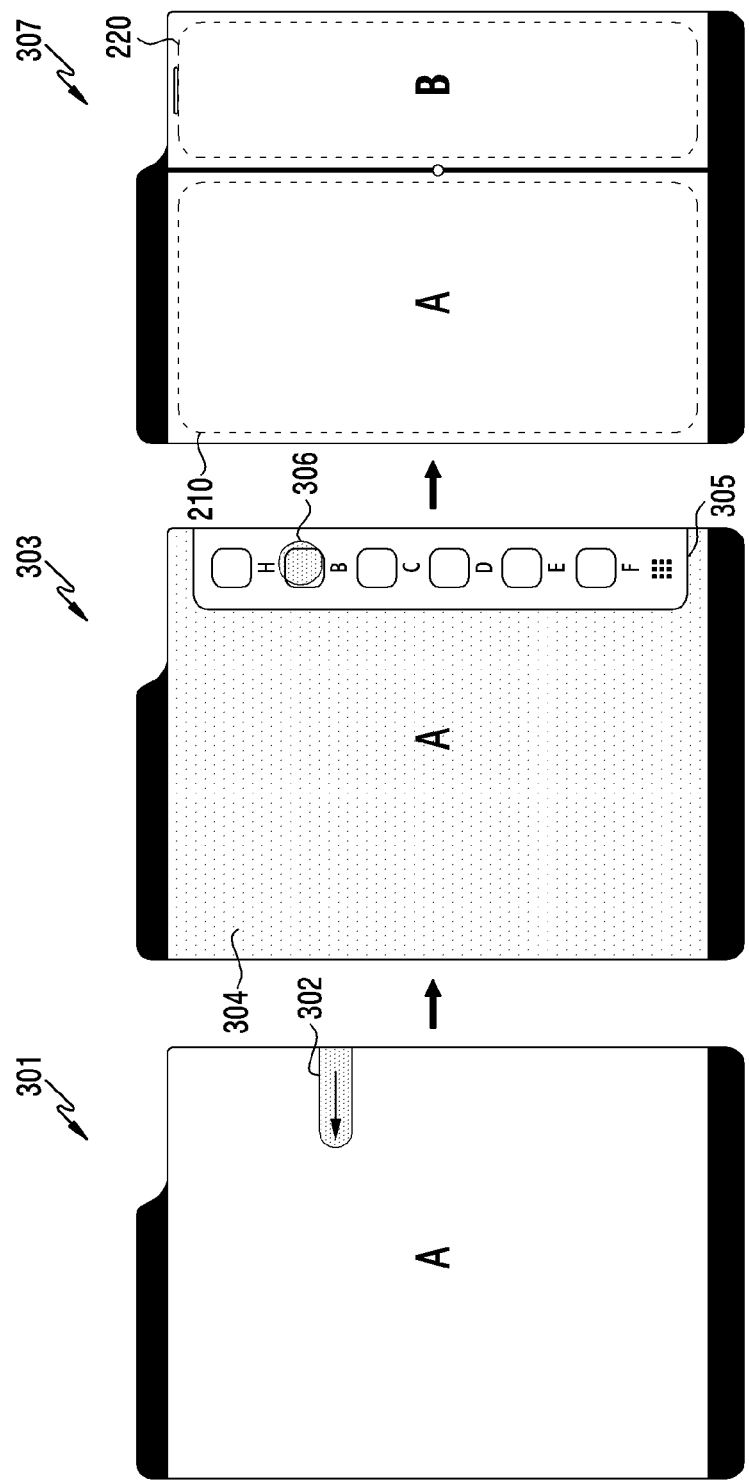
FIG. 3A illustrates an example of a split screen displayed in an electronic device according to various embodiments.

For example, referring to FIG. 3A, in the state 301, while displaying the first screen in the entire first region, the processor 150 may receive, as the specified input, a drag input 302 from an edge region in the first region toward another region in the first region, which is different from the edge region. In response to receiving the drag input 302, the processor 150 may switch the state 301 to a state 303. In certain embodiments, the first drag input is away from an edge of the first region corresponding to the edge region. The processor 150, in the state 303, may display a shaded region 304 over the first screen A in order to indicate that the state of the electronic device 101 is in the state capable of selecting another screen to be provided together with the first screen A in the split screen state. Alternatively, the processor 150, unlike the state 303, may blur the first screen A in order to indicate that the state of the electronic device 101 is in the state capable of selecting another screen to be provided together with the first screen A in the split screen state. The processor 150, in the state 303, may display a list 305 as partially superimposed on the second sub-region 220. In various embodiments, the list 305 may include at least one executable object. In various embodiments, the at least one executable object may indicate some of the applications that have been executed in the second sub-region 220. In various embodiments, at least some of the at least one executable object may be replaced with at least one other executable object, based on an input for scrolling the list 305. For example, based on the input for scrolling the list 305, the processor 150 may display, in the list 305, the at least one other executable object indicating others of the applications that have been executed in the second sub-region 220. In various embodiments, the identification of the at least one executable object or the display order of the at least one executable object may be determined, based on the execution heuristics including an operation history of the second sub-region 220. In various embodiments, the display order of the at least one executable object may be determined based on the recent execution history (or execution order). For example, an executable object H disposed at the uppermost of the at least one executable object in the list 305 may be an executable object for including the application that has most recently been executed in the second sub-region 220 among at least one application indicated by the at least one executable object. In various embodiments, the display order of the at least one executable object may be determined based on the degree of correlation with the first screen A. For example, the executable object H disposed at the uppermost of the at least one executable object in the list 305 may be an executable object for indicating the application having the highest degree of correlation with the first screen A among at least one application indicated by the at least one executable object. In various embodiments, the display order of the at least one executable object may be determined based on the current time. For example, the processor 150 may identify an executable object H indicating the application that has been most frequently executed at the current time and display the executable object H at the uppermost of the list 305. In various embodiments, the display order of the at least one executable object may be determined based on the position at which the electronic device 101 is located. For example, based on identifying that the electronic device 101 is located at home using at least one of a communication circuit of the electronic device 101 or a GPS module of the electronic device 101, the processor 150 may identify an executable object H indicating a music playback application that has been most frequently executed at home, and display the executable object H at the uppermost of the list 305. As another example, based on identifying that the electronic device 101 is located in the car using at least one of a communication circuit of the electronic device 101 or a GPS module of the electronic device 101, the processor 150 may identify an executable object H indicating a navigation application that has been most frequently executed in the car, and display the executable object H at the uppermost of the list 305. However, it is not limited thereto.

In various embodiments, in response to receiving an input for selecting a first executable object from among the at least one executable object included in the list, the processor 150 may display the first screen in the first sub-region and display an execution screen of an application indicated by the first executable object in the second sub-region. For example, the input may include a single tap input. For example, the input may be touching the first executable object with a depression strength smaller than a reference magnitude. As another example, the input may be touching the first executable object for a time less than a reference time. However, it is not limited thereto.

For example, referring to FIG. 3A, in the state 303, the processor 150 may receive an input 306 for selecting s first executable object B in the list 305. In response to receiving the input 306, the processor 150 may switch the state 303 to a state 307. In the state 307, the processor 150 may display the first screen A in the first sub-region 210 and display an execution screen B of an application indicated by the first executable object B in the second sub-region 220. For example, the processor 150 may provide the split screen state by concurrently displaying the first screen A and the execution screen B.

In various embodiments, while displaying the first screen in the first sub-region and the execution screen in the second sub-region, the processor 150 may receive a second drag input from the edge region in the first region toward another region in the first region, which is different from the edge region. For example, while displaying the first screen in the first sub-region and the execution screen in the second sub-region, the processor 150 may receive a second drag input from the edge region in the second sub-region toward another region in the second sub-region, which is different from the edge region. In various embodiments, in response to receiving the second drag input, the processor 150 may display a list as partially superimposed on the execution screen displayed in the second sub-region. In various embodiments, the first executable object indicating the application providing the execution screen in the second sub-region may be removed from the list displayed in response to receiving the second drag input. In various embodiments, if the application providing the execution screen in the second sub-region is an application capable of providing multi-tasking, the first executable object may be maintained without being removed from the list displayed in response to receiving the second drag input. In certain embodiments, the second drag input is away from an edge of the first region corresponding to the edge region.

Figure 3B:
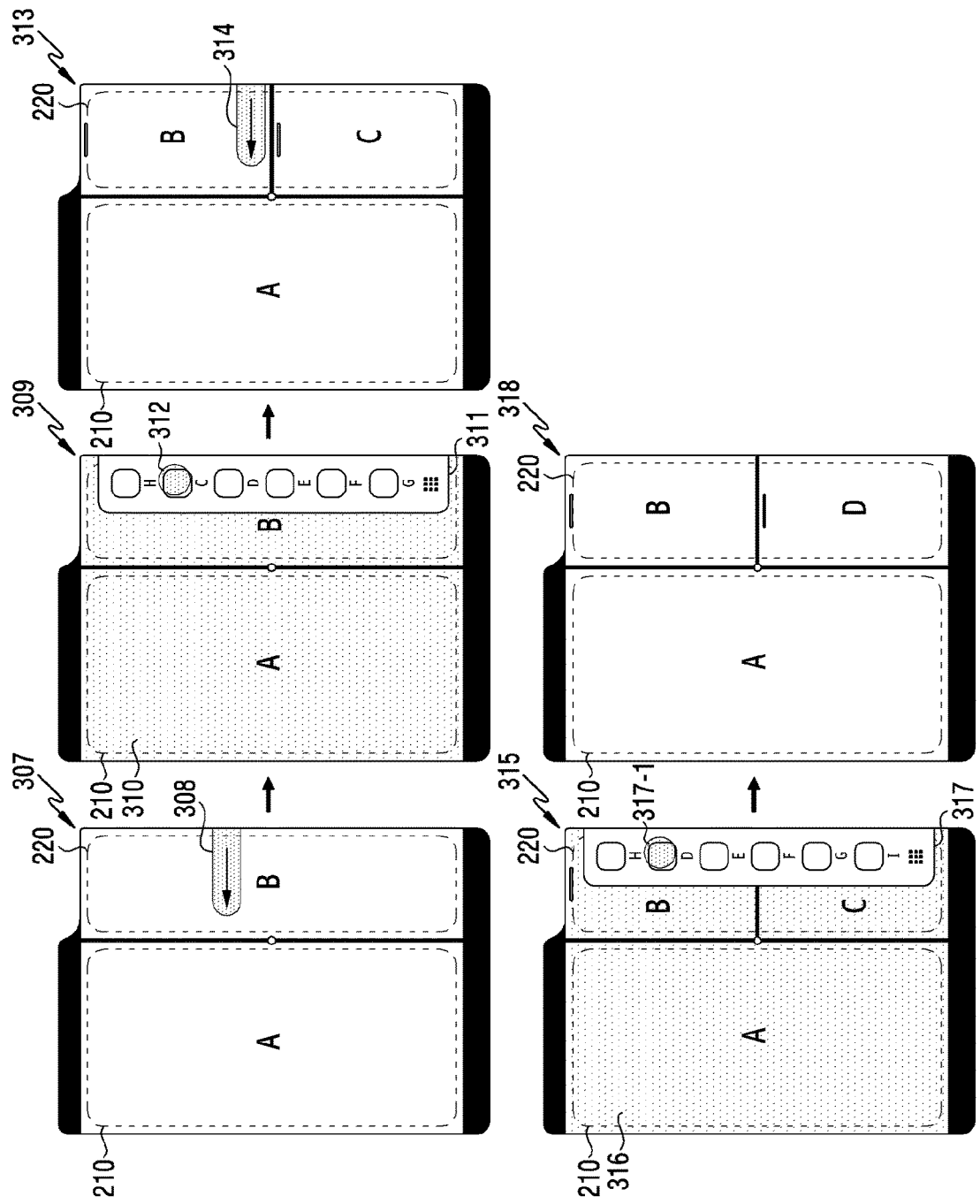
FIG. 3B illustrates another example of a split screen displayed in an electronic device according to various embodiments.

For example, referring to FIG. 3B, the processor 150, in the state 307, may display the first screen A in the first sub-region 210 and display the execution screen B in the second sub-region 220. The processor 150, in the state 307, may receive a second drag input 308 from an edge region of the second sub-region 220 toward another region in the second sub-region 220. In response to receiving the second drag input 308, the processor 150 may switch the state 307 to a state 309. In the state 309, the processor 150 may display a shaded region 310 over the first screen A and the execution screen B in order to indicate that the state of the electronic device 101 is in the state capable of selecting another screen to be provided together with the first screen A and the execution screen B in the split screen state. Alternatively, the processor 150, unlike the state 309, may blur the first screen A and the execution screen B in order to indicate that the state of the electronic device 101 is in the state capable of selecting another screen to be provided together with the first screen A and the execution screen B in the split screen state. The processor 150, in the state 309, may display a list 311 as partially superimposed on the second sub-region 220. If the application providing the execution screen B is an application that does not support multi-tasking, the list 311, unlike the list 305, may not include a first executable object B.

In various embodiments, while displaying the first screen displayed in the first sub-region and the list as superimposed on and the execution screen displayed in the second sub-region, the processor 150 may receive an input for selecting a second executable object from among at least one executable object included in the list. In response to receiving the input for selecting the second executable object, the processor 150 may maintain the disclosure of the first screen in the first sub-region, reduce the execution screen displayed in the second sub-region, and display another execution screen of another application indicated by the second executable object below the reduced execution screen.

For example, referring to FIG. 3B, the processor 150, in the state 309, may receive an input 312 for selecting a second executable object C included in the list 311. In response to receiving the input 312, the processor 150 may switch the state 309 to a state 313. In the state 313, the processor 150 may maintain the display of the first screen A in the first sub-region 210, reduce the execution screen B displayed in the second sub-region 220, and display another execution screen C of another application indicated by the second executable object C below the reduced execution screen B.

In various embodiments, while displaying the first screen in the first sub-region and displaying the execution screen and the another execution screen in the second sub-region, the processor 150 may receive third drag input from the edge region in the first region toward another region in the first region, which is different from the edge region. In response to receiving the third drag input, the processor 150 may display a list excluding the first executable object for indicating the application providing the execution screen and the second executable object for indicating another application providing the another execution screen as partially superimposed on the execution screen and the another execution screen displayed in the second sub-region. In various embodiments, if at least one of the application providing the execution screen or the another application providing the another execution screen is an application capable of providing multi-tasking, at least one of the first executable object or the second executable object may be maintained without being removed from the list displayed in response to receiving the third drag input. In certain embodiments, the third drag input is away from an edge of the first region corresponding to the edge region.

For example, referring to FIG. 3B, the processor 150, in the state 313, may display the first screen A in the first sub-region 210 and display the execution screen B and another execution screen C in the second sub-region 220. The processor 150, in the state 313, may receive a third drag input 314 from an edge region of the second sub-region 220 toward another region in the second sub-region 220. In response to receiving the third drag input 314, the processor 150 may switch the state 313 to a state 315. In the state 315, the processor 150 may display a shaded region 316 over the first screen A, the execution screen B, and the another execution screen C in order to indicate that the state of the electronic device 101 is in the state capable of selecting another screen to be provided together with the first screen A and the execution screen B in the split screen state. Alternatively, the processor 150, unlike the state 315, may blur the first screen A, the execution screen B, and the another execution screen C in order to indicate that the state of the electronic device 101 is in the state capable of selecting another screen to be provided together with the first screen A and the execution screen B in the split screen state. The processor 150, in the state 315, may display a list 317 as partially superimposed on the second sub-region 220. If at least one of the application providing the execution screen B or another application providing another execution screen C is an application that does not support multi-tasking, the list 317, unlike the list 305 and the list 311, may not include the first executable object B and the second executable object C.

In various embodiments, while displaying the list as partially superimposed on the execution screen and the another execution screen displayed in the second sub-region, the processor 150 may receive an input for selecting a third executable object from among at least one executable object included in the list. In response to receiving the input for selecting the third executable object, the processor 150 may maintain the display of the first screen in the first sub-region and the display of the execution screen in a portion of the second sub-region and switch the another execution screen displayed in the remaining portion of the second sub-region to an execution screen of an application indicated by the third executable object.

For example, referring to FIG. 3B, the processor 150, in the state 315, may receive an input 317-1 for selecting a third executable object D that is included in the list 317. In response to receiving the input 317-1, the processor 150 may switch the state 315 to a state 318. In the state 318, the processor 150 may maintain the display of the first screen A in the first sub-region 210 and the display of the execution screen B in a portion of the second sub-region 220, and switch another execution screen C displayed in the remaining portion of the second sub-region 220 to an execution screen D of an application indicated by the third executable object D. In various embodiments, in the case of switching the execution screen C to the execution screen D of the application indicated by the third executable object D, the executable object C may be disposed at the uppermost of the at least one executable object in the list 317.

In various embodiments, while displaying the first screen in the first region and the list superimposed on the first screen displayed in the first region, the processor 150 may receive an input for selecting a specified object included in the list. In various embodiments, the specified object may be an object for expanding the display region of the list. In various embodiments, due to the limitation in the area of the list superimposed on the first screen displayed in the first region, the specified object may be an object for displaying at least one of another executable object, which is newly displayed based on a scroll input to the list, together with the at least one executable object. In various embodiments, in response to receiving the input for selecting the specified object, the processor 150 may switch the first screen displayed in the first sub-region and the execution screen displayed in the second sub-region to an expanded list. In various embodiments, in response to receiving the input for selecting the specified object, the processor 150 may display the expanded list as partially superimposed on the first screen displayed in the first sub-region and the execution screen displayed in the second sub-region. However, it is not limited thereto.

In various embodiments, at least one executable object (e.g., six executable objects) displayed at the uppermost of the executable objects included in the list or the expanded list may be displayed in the order in which they have recently been executed, and the remaining executable objects among the executable objects may be displayed in alphabetical order. In various embodiments, the number of at least one executable object displayed at the uppermost may be determined based on the user's setting or the setting of the electronic device 101. In various embodiments, if the recently executed application is changed due to the use of the electronic device 101 by the user, at least one executable object displayed at the uppermost may be changed. For example, if the application indicated by one executable object among the remaining executable object is executed by the user's use of the electronic device, the processor 150 may update the list or the expanded list such that the at least one executable object displayed at the uppermost includes the executable object for indicating the application. In various embodiments, the executable object for indicating the application, which is included in the remaining executable objects, may be removed from the remaining executable objects by the user's use of the electronic device 101.

Figure 3C:
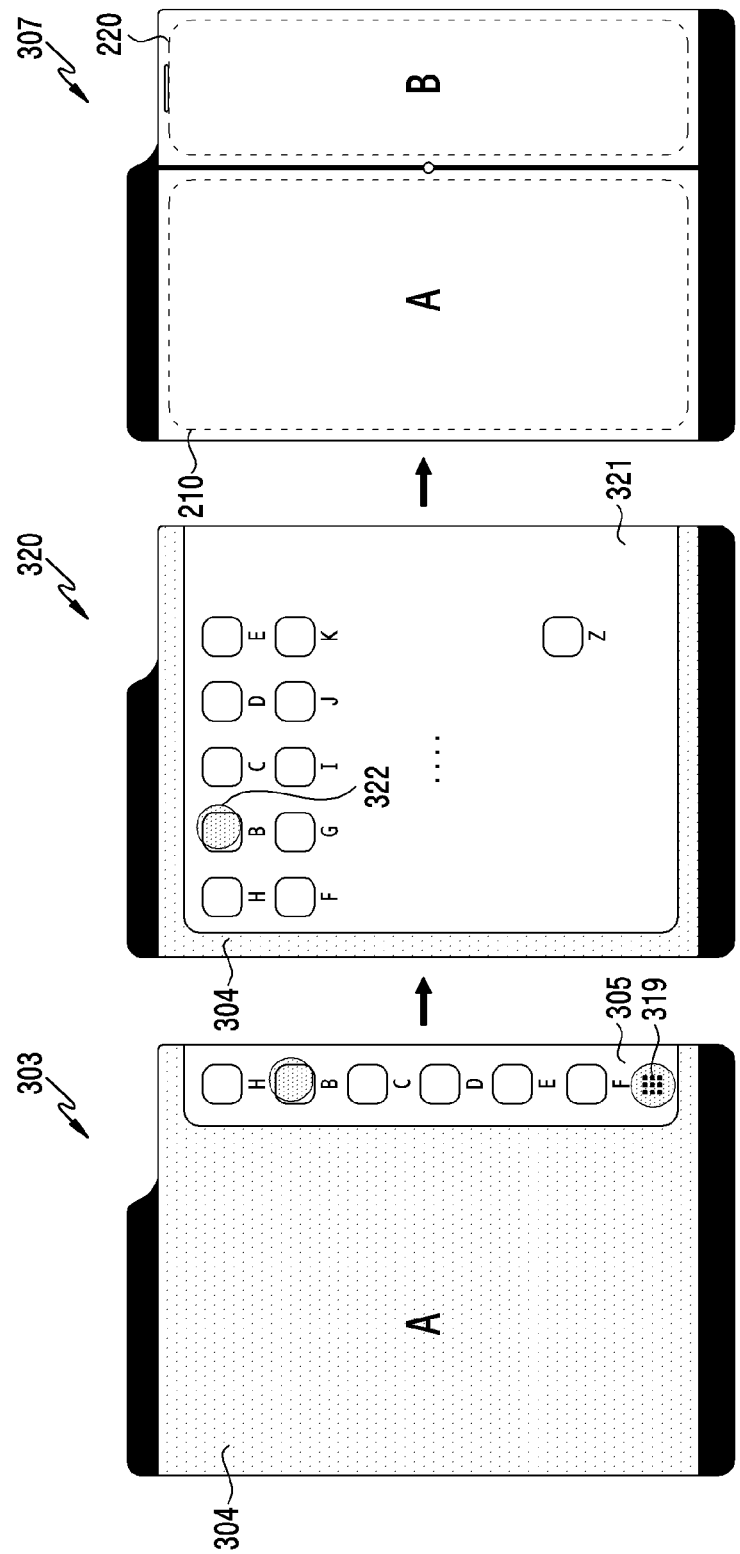
FIG. 3C illustrates another example of a split screen displayed in an electronic device according to various embodiments.

For example, referring to FIG. 3C, in the state 303, the processor 150 may display a first screen A in the first region including a first sub-region 210 and a second sub-region 220 and display a list 305 as partially superimposed on the first screen A. In various embodiments, the list 305 may include a specified object (e.g., a menu icon), as well as at least one executable object. In response to reception of an input 319 for selecting the specified object, the processor 150 may switch the state 303 to a state 320. In the state 320, the processor 150 may display a shaded region 304 over the first screen A in order to indicate that the state of the electronic device 101 is in the state capable of selecting another screen to be provided together with the first screen A in the split screen state. Alternatively, the processor 150 may blur the first screen A in order to indicate that the state of the electronic device 101 is in the state capable of selecting another screen to be provided together with the first screen A in the split screen state. In the state 320, the processor 150 may display an expanded list 321. In various embodiments, the expanded list 321, as in the state 320, may be superimposed on the first screen A. In various embodiments, the expanded list 321, unlike that shown in FIG. 3C, may be switched from the first screen A. However, it is not limited thereto. In various embodiments, the expanded list 321 may further include other executable objects as well as the executable objects displayed in the list 305 in the state 303. For example, the other executable objects may be executable objects to be displayed in the list 305 by a scroll input to the list 305 in the state 303.

In various embodiments, in response to receiving the input for selecting one executable object from among the executable objects included in the expanded list, the processor 150 may reduce the first screen displayed in the first region, display the reduced first screen in the first sub-region, and display an execution screen of an application indicated by the selected executable object in the second sub-region.

For example, referring to FIG. 3C, in the state 320, the processor 150 may receive an input 322 for selecting a first executable object B included in the expanded list 321. In response to receiving the input 322, the processor 120 may switch the state 320 to a state 307. In the state 307, the processor 150 may display the first screen A in the first sub-region 210 and display an execution screen B of an application indicated by the first executable object B in the second sub-region 220.

In various embodiments, in response to reception of a second user input for moving a second executable object that is held by a first user input, among the at least one executable object included in the list, while displaying the first screen in the first sub-region, the execution screen of the application indicated by the first executable object in the second sub-region, and the list as superimposed on the execution screen, the processor 150 may determine screens to be displayed in the first sub-region and the second sub-region, based on the destination of the second executable object moved by the second user input. For example, the first user input may be touching the second executable object with a depression strength greater than a reference magnitude. As another example, the first user input may be touching the second executable object for a time longer than a reference time. However, it is not limited thereto. For example, the second user input may be an input for moving (dragging) the second executable object held by the first user input and then dropping the moved second executable object.

Figure 4A:
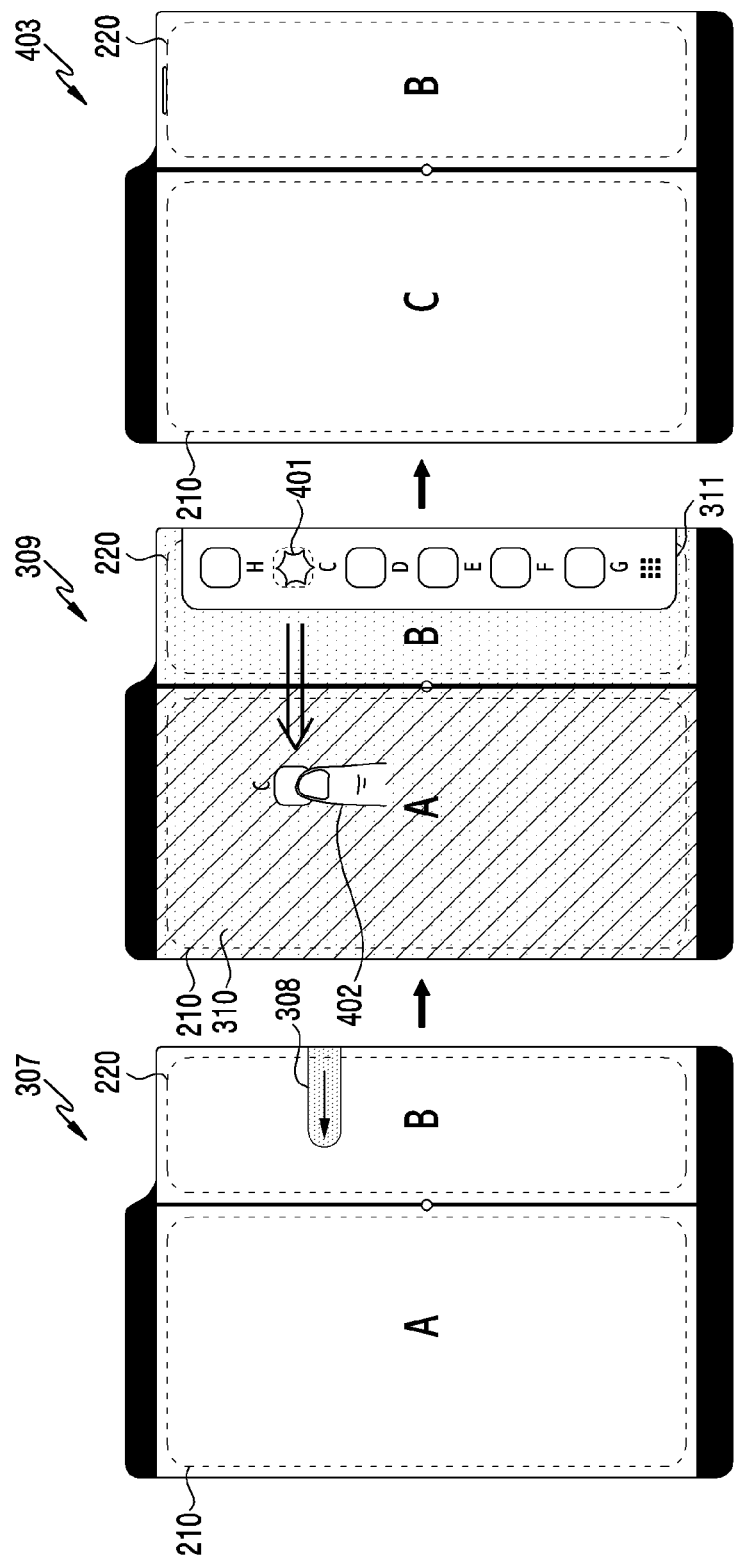
FIG. 4A illustrates an example of a method of controlling a split screen using a drag input in an electronic device according to various embodiments.

For example, if the second executable object held by the first user input is dropped onto the first sub-region by the second user input, the processor 150 may maintain the display of the execution screen in the second sub-region and switch the first screen displayed in the first sub-region to the another execution screen of the another application indicated by the second executable object. For example, referring to FIG. 4A, the processor 150, in the state 307, may receive a second drag input 308. In response to receiving the second drag input 308, the processor 150 may switch the state 307 to a state 309. In the state 309, the processor 150 may display a shaded region 310 and a list 311 as partially superimposed on the first screen A and the execution screen B. In the state 309, the processor 150 may receive a first user input 401 for holding the second executable object C included in the list 311. The processor 150 may receive a second user input 402 for moving the second executable object C held by the first user input 401 to the first sub-region 210 in the state 309. In response to receiving the second the user input 402, the processor 150 may switch the state 309 to a state 403. In the state 403, the processor 150 may maintain the display of the execution screen B in the second sub-region 220 and switch the first screen A displayed in the first sub-region 210 to another execution screen C of the another application indicated by the second executable object C.

Figure 4B:
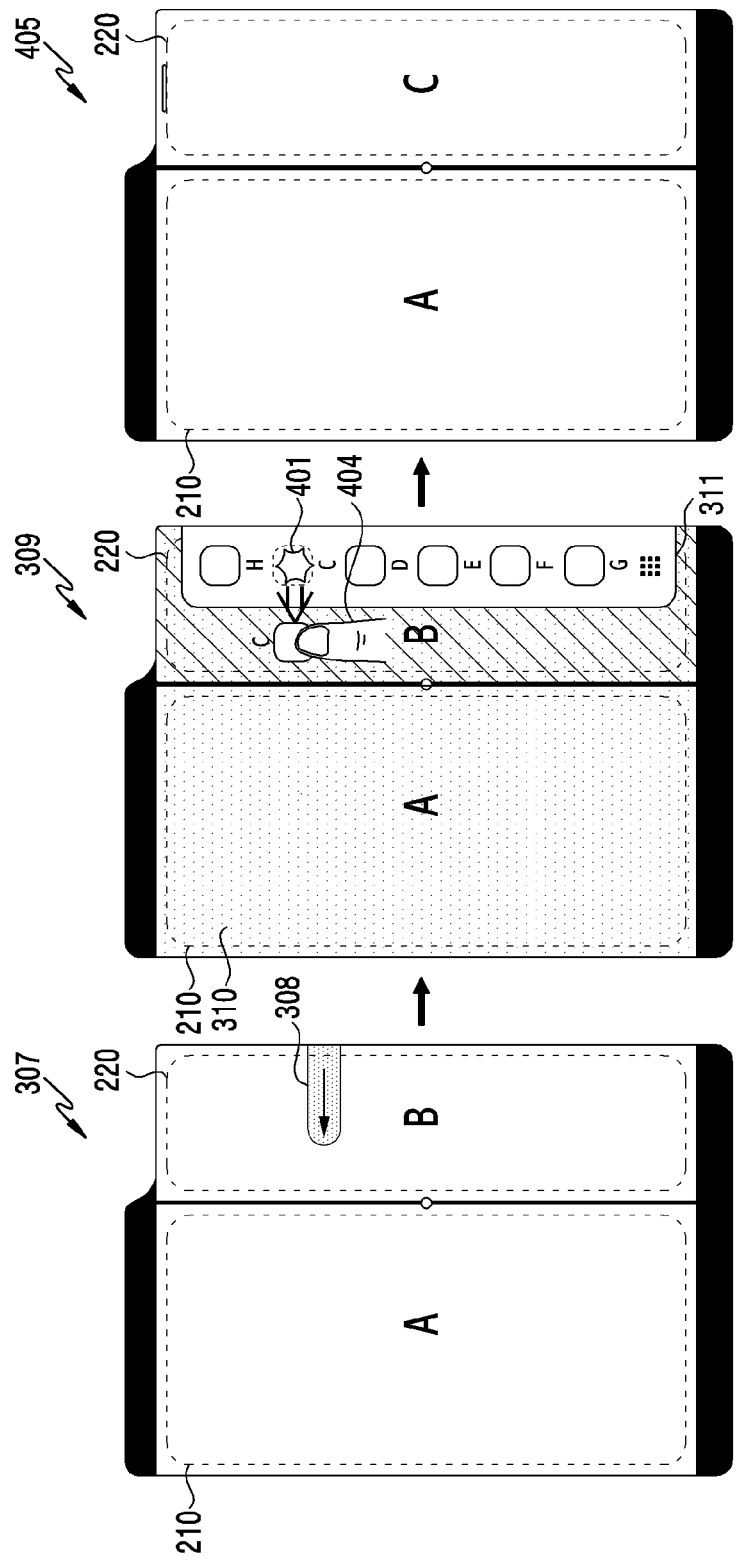
FIG. 4B illustrates another example of a method of controlling a split screen using a drag input in an electronic device according to various embodiments.

As another example, if the second executable object held by the first user input is dropped onto the second sub-region by the second user input, the processor 150 may maintain the display of the first screen in the first sub-region and switch the execution screen displayed in the second sub-region to the other execution screen of the other application. For example, referring to FIG. 4B, the processor 150 may receive a second drag input 308 in the state 307. In response to receiving the second drag input 308, the processor 150 may switch the state 307 to a state 309. In the state 309, the processor 150 may display a shaded region 310 and a list 311 as at least partially superimposed on the first screen A and the execution screen B. In the state 309, the processor 150 may receive a first user input 401 to hold a second executable object C included in the list 311. The processor 150 may receive a second user input 404 to move the second executable object C held by the first user input 401 to the second sub-region 220 in the state 309. In response to receiving the second user input 404, the processor 150 may switch the state 309 to a state 405. In the state 405, the processor 150 may maintain the display of the first screen A in the first sub-region 210 and may switch the execution screen B displayed in the second sub-region 220 to another execution screen C of the another application indicated by the second executable object C.

Figure 4C:
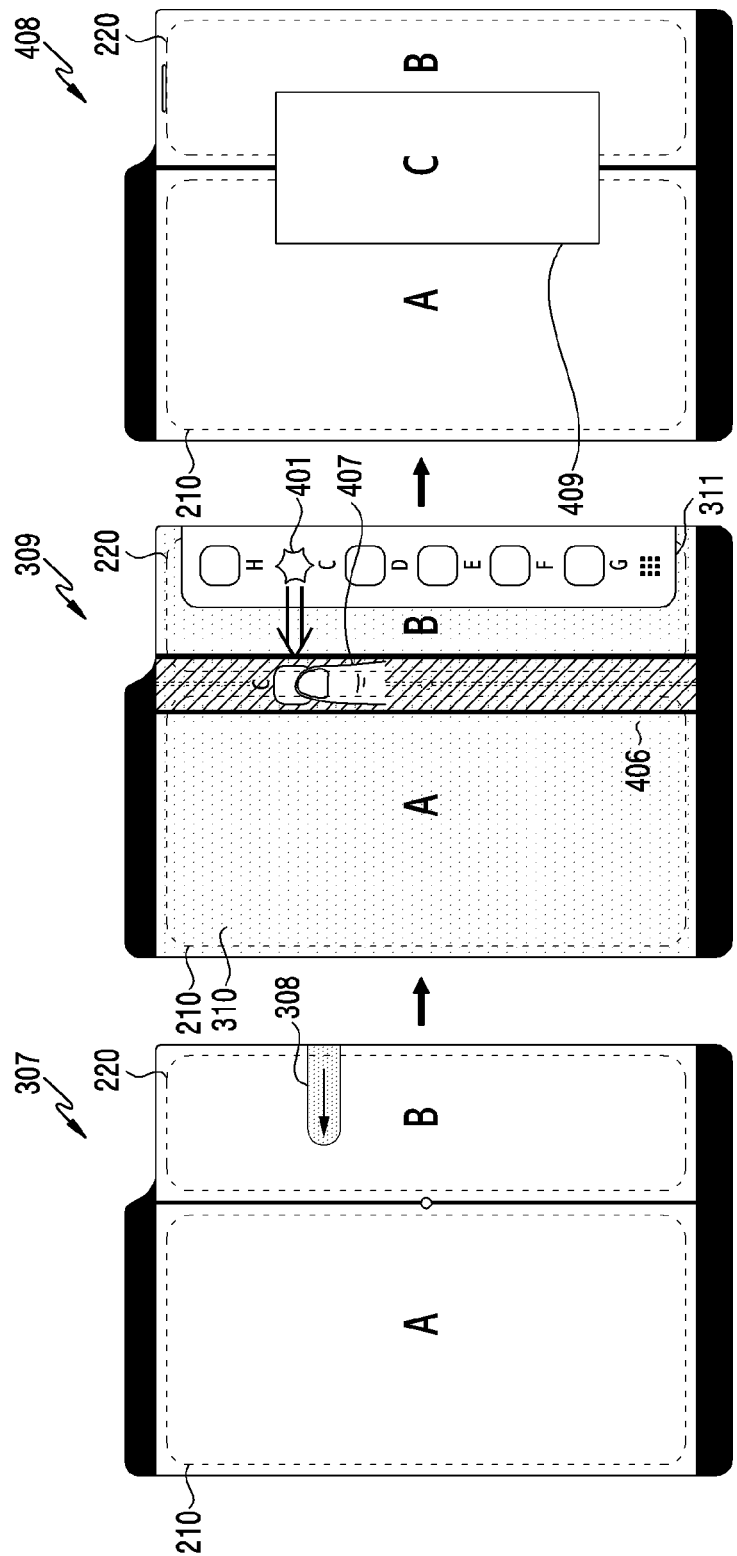
FIG. 4C illustrates another example of a method of controlling a split screen using a drag input in an electronic device according to various embodiments.

As another example, when the second executable object held by the first user input is dropped by the second user input onto a specified region including the boundary between the first sub-region and the second sub-region, the processor 150 may maintain the display of the first screen in the first sub-region and the display of the execution screen in the second sub-region and display the another execution screen of the another application as superimposed on the first screen maintained in the first sub-region and the second screen maintained in the second sub-region. For example, referring to FIG. 4C, the processor 150 may receive a second drag input 308 in a state 307. In response to receiving the second drag input 308, the processor 120 may switch the state 307 to a state 309. In the state 309, the processor 150 may display a shaded region 310 and a list 311 as at least partially superimposed on the first screen A and the execution screen B. In the state 309, the processor 150 may receive a first user input 401 for holding a second executable object C included in the list 311. The processor 150 may receive a second user input 407 for moving the second executable object C held by the first user input 401 to a specified region 406 including the boundary between the first sub-region 210 and the second sub-region 220 in the state 309. In various embodiments, the specified region 406 may be a region defined to display another execution screen C of the another application indicated by the second executable object C in a window mode. In various embodiments, the specified region 406 may be a region within a specified distance from the boundary between the first sub-region 210 and the second sub-region 220. In response to receiving the second user input 407, the processor 150 may switch the state 309 to a state 408. In the state 408, the processor 150 may maintain the display of the first screen A in the first sub-region 210 and the display of the execution screen B in the second sub-region 220, and display a window 409 (e.g., a pop up view or a floating window) including another execution screen C of the another application indicated by the second executable object C as partially superimposed on the first screen A and the execution screen B.

Figure 4D:
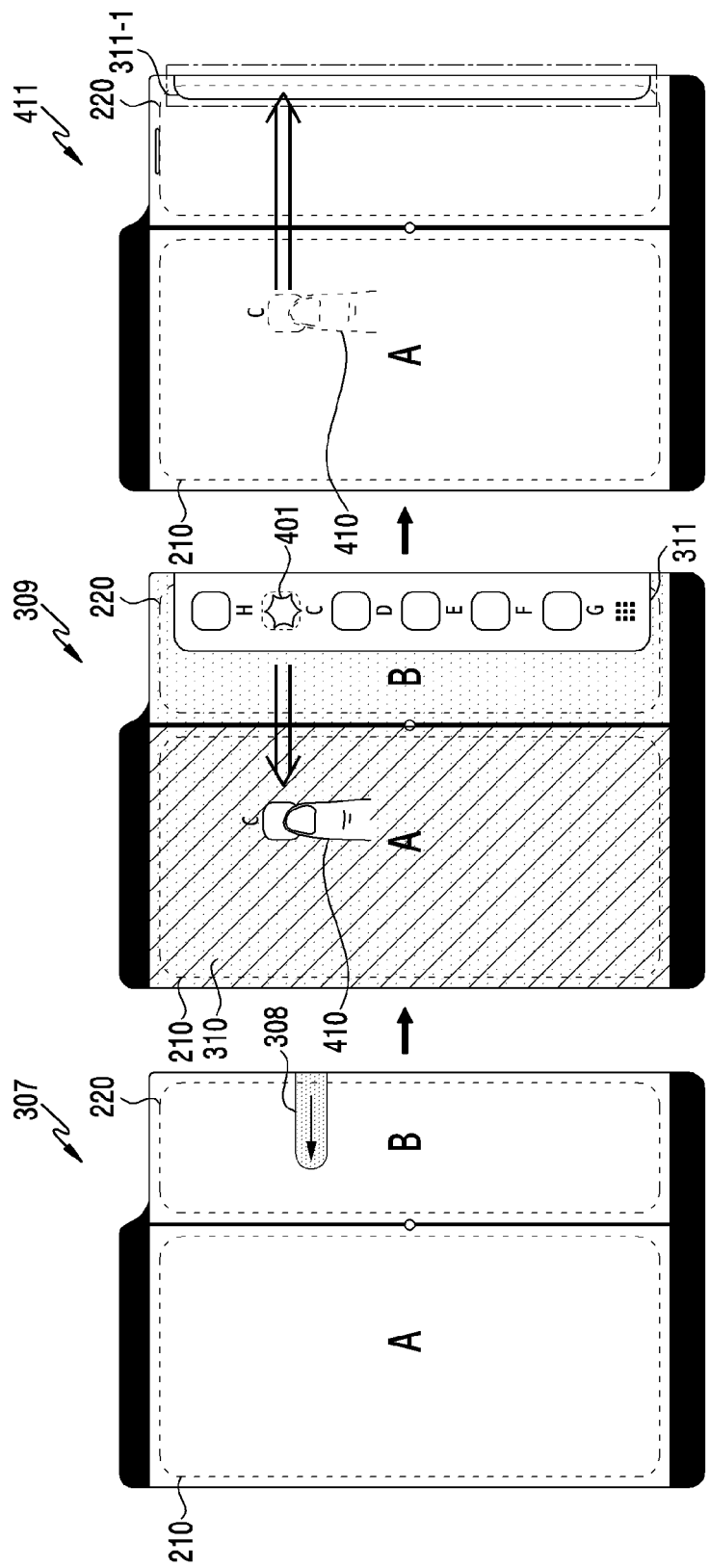
FIG. 4D illustrates another example of a method of controlling a split screen using a drag input in an electronic device according to various embodiments.

As another example, when the second executable object held by the first user input is dropped onto the list, the processor 150 may maintain the display of the first screen in the first sub-region and the display of the execution screen in the second sub-region, and reinsert the second executable object into the list. For example, referring to FIG. 4D, the processor 150 may receive a second drag input 308 in a state 307. In response to receiving the second drag input 308, the processor 150 may switch the state 307 to a state 309. In the state 309, the processor 150 may display a shaded region 310 and a list 311 as at least partially superimposed on the first screen A and the execution screen B. In the state 309, the processor 150 may receive a first user input 401 for holding a second executable object C included in list 311. The processor 150 may receive a second user input 410 for reinserting the second executable object C held by the first user input 401 into the list 311 in the state 309. The processor 150 may switch the state 309 to a state 411 in response to receiving the second user input 410. In the state 411, the processor 150 may maintain the display of the first screen A in the first sub-region 210 and the display of the execution screen B in the second sub-region 220, and reinsert the second executable object C into the list 311.

In various embodiments, when the second executable object C held by the first user input 401 is moved from the list 311 to a region outside the list 311, the processor 150 may hide the list 311 or display a simplified list 311-1 as in the state 411. When the second executable object C held by the first user input 401 approaches within a specified distance from the simplified list 311-1, the processor 150 may switch the simplified list 311-1 to the list 311. In various embodiments, the executable object C held by the first user input 401 may be inserted into the list 311 switched from the list 311-1 by the second user input 410.

Figure 5:
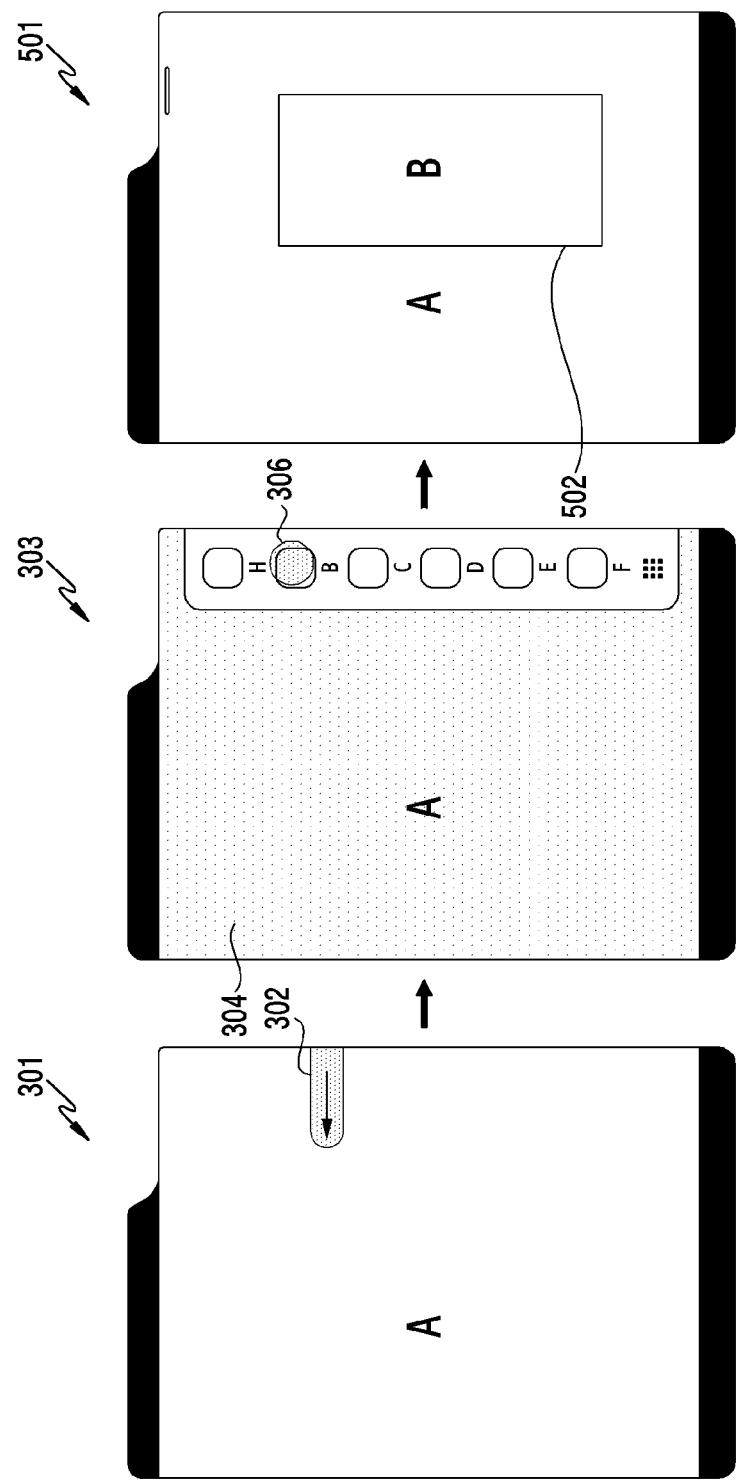
FIG. 5 illustrates an example of a method of determining whether or not to provide a split screen state according to a display property of a first screen in an electronic device according to various embodiments.

In various embodiments, in response to receiving the input for selecting the first executable object from among the at least one executable object included in the list superimposed on the first screen displayed in the first region, the processor 150 may identify whether the first screen is displayable in the first sub-region. Based on identifying that the first screen is displayable in the first sub-region, the processor 150 may display the first screen in the first sub-region and display the execution screen of the application indicated by the first executable object in the second sub-region. Based on identifying that the first screen is not displayable in the first sub-region, the processor 150 may maintain the display of the first screen in the first region and display the execution screen of the application as partially superimposed on the first screen displayed in the first region. For example, referring to FIG. 5, in a state 301, the processor 150 may receive a first drag input 302. In response to receiving the first drag input 302, the processor 150 may switch the state 301 to a state 303. In the state 303, the processor 150 may display a shaded region 304 as superimposed on the first region including the first sub-region 210 and the second sub-region 220, and a list 305 as partially superimposed on the second sub-region 220. The list 305 may include at least one executable object. In the state 303, the processor 150 may receive an input 306 for selecting a first executable object B included in the list 305. In response to receiving the input 306, the processor 150 may identify whether or not the first screen A is displayable in the first sub-region 210. Based on identifying that the first screen A is displayable in the first sub-region 210, the processor 150 may switch the state 303 to a state 307 in FIG. 3A. Based on identifying that the first screen A is not displayable in the first sub-region 210, the processor 150 may switch the state 303 to a state 501. In the state 501, the processor 150 may maintain the display of the first screen A in the first region and display a window 502 including an execution screen B of an application indicated by the first executable object B as superimposed on the first screen A.

In various embodiments, while displaying the execution screen in the first sub-region and another execution screen in the second sub-region for the first screen, the processor 150 may receive an input for displaying another list including at least one other executable object for indicating some of the applications that have been executed in the first sub-region. In response to receiving the input, the processor 150 may switch the first screen displayed in the first sub-region to the another list including an executable object for indicating the application providing the first screen and the at least one other executable object, and maintain the display of the execution screen in the second sub-region. In various embodiments, in response to reception of a second user input for moving the executable object held by a first user input, among the at least one other executable object and the executable object for indicating the application providing the first screen included in the another list, to the second sub-region, the processor 150 may display the another list excluding the moved executable object in the first sub-region and display an execution screen of an application indicated by the moved executable object in the second sub-region. For example, the first user input may be touching the executable object in the another list with a depression strength greater than a reference magnitude. As another example, the first user input may be touching the executable object in the list for a time longer than a reference time. However, it is not limited thereto. For example, the second user input may be an input for moving the executable object held by the first user input and then dropping the moved executable object.

Figure 6:
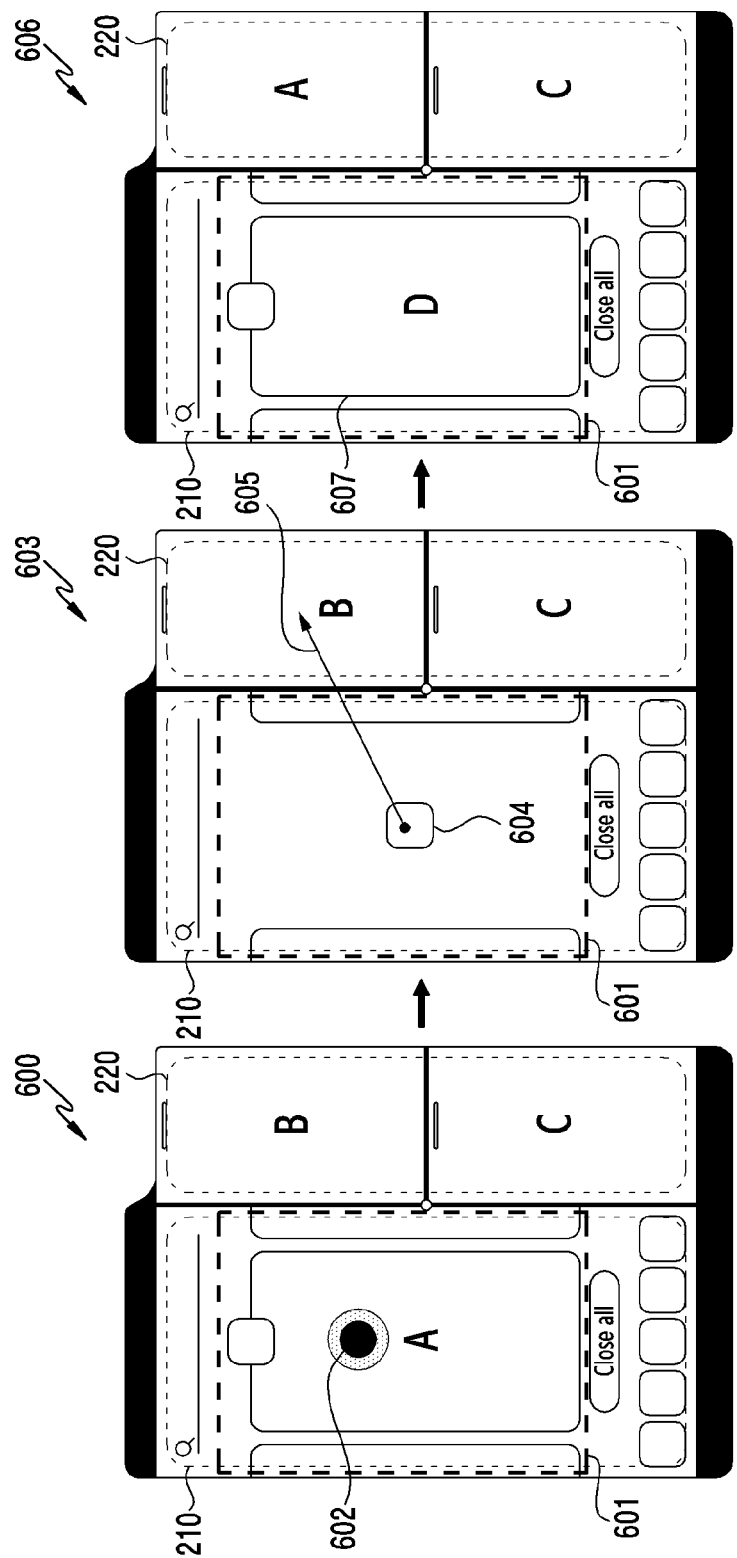
FIG. 6 illustrates an example of a method of providing a split screen in an electronic device according to various embodiments.

For example, referring to FIG. 6, in a state 600, the processor 150 may display another list 601 in the first sub-region 210 and display an execution screen B and another execution screen C in the second sub-region 220. The processor 150 may receive a first user input 602 for holding an executable object A in another list 601 in the state 600. The processor 150 may switch the state 600 to a state 603 in response to receiving the first user input 602. In the state 603, the processor 150 may display an executable object 604 converted from the executable object A held by the first user input 602. The shape of the executable object 604 in the state 603 may be different from the shape of the executable object A in the state 600. The processor 150 may receive a second user input 605 for moving the executable object 604 held by the first user input 602 to the execution screen B displayed in a portion of the second sub-region 220 in the state 603. The processor 150 may switch the state 603 to a state 606 in response to receiving the second user input 605. In the state 606, the processor 150 may switch the execution screen B to an execution screen A of an application indicated by the executable object 604. In the state 606, the processor 150 may display another list 601 excluding the executable object A in the first sub-region 210.

In various embodiments, the processor 150 may detect a specified event while displaying the first screen in the first sub-region and the execution screen in the second sub-region. In various embodiments, the specified event may be an event for displaying a notification message on the foldable display 140. For example, the specified event may be an event for displaying the notification message on the upper portion of the first region. In response to the detection, the processor 150 may display the notification message as partially superimposed on the first sub-region and the second sub-region. The processor 150 may determine a screen to be displayed in the first sub-region and the second sub-region, based on an input to the notification message.

Figure 7:
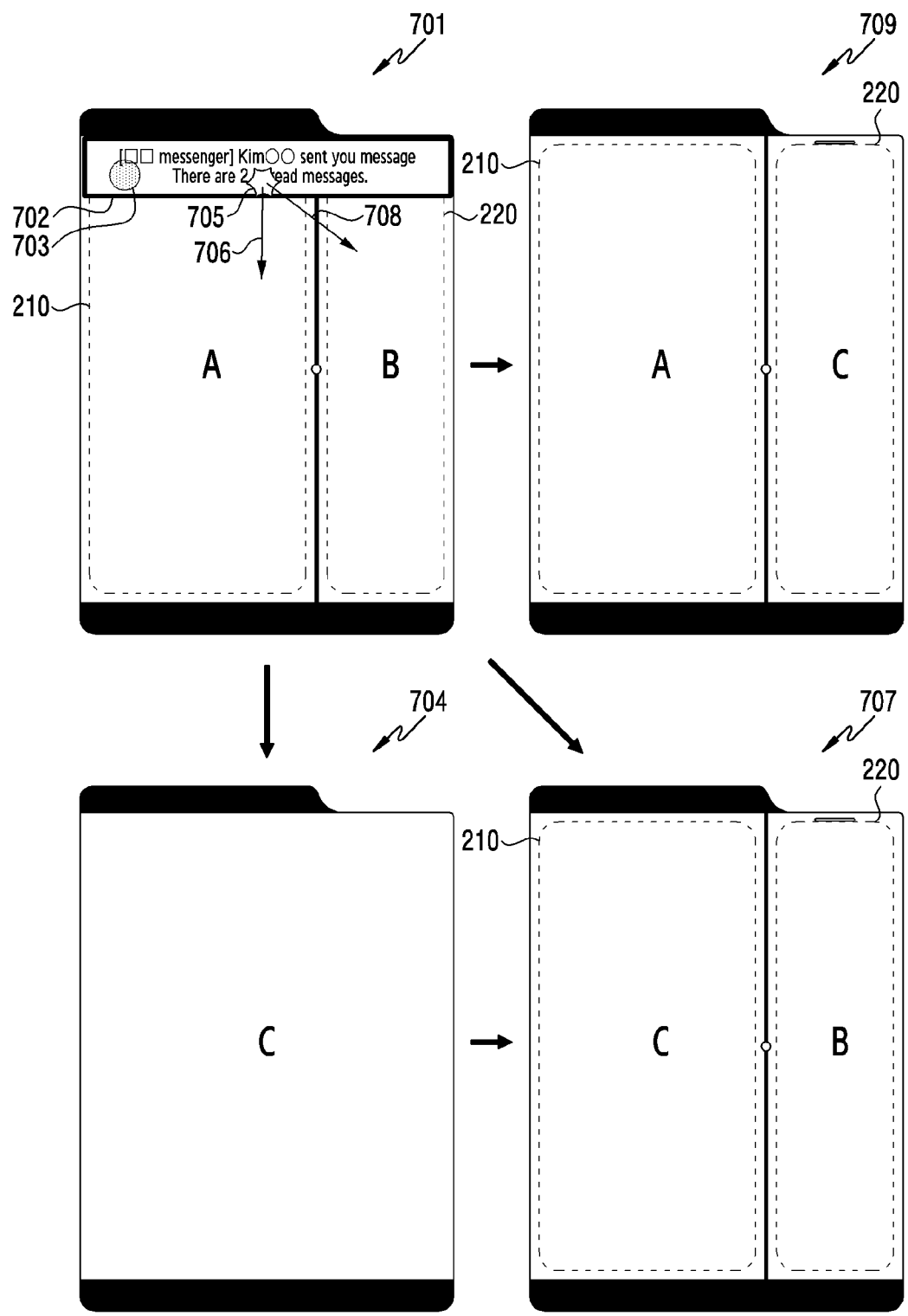
FIG. 7 illustrates an example of a method of processing a notification message in a split screen state in an electronic device according to various embodiments.

For example, referring to FIG. 7, in a state 701, the processor 150 may detect the specified event while displaying the first screen A in the first sub-region 210 and the execution screen B in the second sub-region 220. In response to the detection, the processor 150 may display a notification message 702 as partially superimposed on the first screen A and the execution screen B in the state 701. In response to receiving the first user input 703 to the notification message 702 in the state 701, the processor 150 may switch the state 701 to a state 704. In various embodiments, the first user input 703 may be touching the notification message 702 with a depression strength less than a reference magnitude. In various embodiments, the first user input 703 may be touching the notification message 702 for a time less than a reference time. In the state 704, the processor 150 may display another execution screen C of an application providing the notification message 702 in the first region including the first sub-region 210 and the second sub-region 220. According to embodiments, the processor 150 may switch the state 701 to a state 707 in response to receiving the first user input 703 in the state 701.

The processor 150 may receive a second user input 705 for holding the notification message 702 in the state 701 and receive a third user input 706 for moving the notification message 702 held by the second user input 705 to the first sub-region 210. In various embodiments, the second user input 705 may be touching the notification message 702 with a depression strength greater than or equal to a reference magnitude. In various embodiments, the second user input 705 may be touching the notification message 702 for a time more than or equal to a reference time. The processor 150 may switch the state 701 to a state 707, based on the second user input 705 and the third user input 706. In the state 707, the processor 150 may switch the first screen A displayed in the first sub-region 210 to another execution screen C of the application providing the notification message 702 and maintain the display of the execution screen B in the second sub-region 220. According to embodiments, while the notification message 702 held by the second user input 705 stays on the first sub-region 210, the processor 150 may display a shaded region like the shaded region 304 in FIGS. 3A to 3C over the first sub-region 210.

The processor 150 may receive a second user input 705 for holding the notification message 702 in the state 701 and receive a third user input 708 for moving the notification message 702 held by the second user input 705 to the second sub-region 220. The processor 150 may switch the state 701 to a state 709, based on the second user input 705 and the third user input 708. In the state 709, the processor 150 may maintain the display of the first screen A in the first sub-region 210 and switch the execution screen B displayed in the second sub-region 220 to another execution screen C of the application providing the notification message 702. According to embodiments, while the notification message 702 held by the second user input 705 stays on the second sub-region 220, the processor 150 may display a shaded region like the shaded region 304 in FIGS. 3A to 3C over the second sub-region 220.

In various embodiments, the processor 150 may display another execution screen C of an application providing the notification message 702 in a portion of the second sub-region 220, based on the position where the notification message 702 is dropped by the third user input 708. For example, when the notification message 702 is dropped onto the upper portion of the second sub-region 220 by the third user input 708, the processor 150 may display another execution screen C in the portion (i.e., the upper portion) of the second sub-region 220 and display the reduced execution screen B in the remaining portion of the second sub-region 220. For example, the execution screen B may be displayed below another execution screen C. According to embodiments, before the notification message 702 is dropped onto the upper portion of the second sub-region 220, the processor 150 may display a shaded region over the portion of the second sub-region 220 in which another execution screen C is to be displayed. As another example, when the notification message 702 is dropped onto the middle portion of the second sub-region 220 by the third user input 708, the processor 150 may stop displaying the execution screen B in the second sub-region 220 and display another execution screen C in the entire second sub-region 220. According to some embodiments, before the notification message 702 is dropped onto the middle portion of the second sub-region 220, the processor 150 may display a shaded region over the entire second sub-region 220 in which another execution screen C is to be displayed. As another example, when the notification message 702 is dropped onto the lower portion of the second sub-region 220 by the third user input 708, the processor 150 may display the reduced execution screen B in the portion of the second sub-region 220 and display another execution screen C in the remaining portion of the second sub-region. For example, another execution screen C may be displayed below the execution screen B. According to embodiments, before the notification message 702 is dropped onto the lower portion of the second sub-region

220, the processor 150 may display a shaded region over the remaining portion of the second sub-region 220 in which another execution screen C is to be displayed. However, it is not limited thereto.

In various embodiments, when the notification message 702 is dropped onto the middle portion of the second sub-region 220 by the third user input 708 while displaying the first screen A on the entire screen, the processor 150 may display the first screen A in the first sub-region 210 and display the execution screen C of the application providing the notification message 702 in the entire second sub-region 220. According to embodiments, before the notification message 702 is dropped onto the middle portion of the second sub-region 220, the processor 150 may display a shaded region over the entire second sub-region 220 in which another execution screen C is to be displayed.

As described above, the electronic device 101 according to various embodiments may switch a single screen state to a split screen state or control the number of screens to be provided in the split screen state, based on various interactions received by the electronic device 101. The electronic device 101 according to various embodiments is able to provide an enhanced user experience through the above switching and control.

As described above, an electronic device according to various embodiments may include at least one memory configured to store instructions, a foldable display, and at least one processor operably coupled with the foldable display and the at least one memory, and configured, when executing the instructions, to display a first screen in a first region of the foldable display including a first sub-region and a second sub-region beside the first sub-region while the foldable display is in an unfolded state, receive a first drag input from an edge region in the first region toward another region in the first region, which is different from the edge region, while displaying the first screen in the first region, display a list including at least one executable object for indicating some of the applications that have been executed in the second sub-region as partially superimposed on the first screen displayed in the first region in response to receiving the first drag input, and, in response to receiving an input for selecting a first executable object from among the at least one executable object included in the list, display the first screen in the first sub-region and display an execution screen of an application indicated by the first executable object in the second sub-region, wherein the area of the first sub-region may be greater than the area of the second sub-region. In certain embodiments, the first drag input is away from an edge of the first region corresponding to the edge region.

In various embodiments, the at least one processor may be further configured, when executing the instructions, to receive a second drag input from the edge region in the first region toward another region in the first region, which is different from the edge region, while displaying the first screen in the first sub-region and the execution screen in the second sub-region, display the list excluding the first executable object as partially superimposed on the execution screen displayed in the second sub-region in response to receiving the second drag input, and, in response to receiving an input for selecting a second executable object from among at least one executable object included in the list excluding the first executable object, maintain the display of the first screen in the first sub-region, reduce the execution screen displayed in the second sub-region, and display another execution screen of another application indicated by the second executable object below the reduced execution screen. In various embodiments, the at least one processor may be further configured, when executing the instructions, to receive a third drag input from the edge region in the first region toward another region in the first region, which is different from the edge region, while displaying the first screen in the first sub-region, and the reduced execution screen and the another execution screen in the second sub-region, display the list excluding the first executable object and the second executable object as partially superimposed on the execution screen and the another execution screen displayed in the second sub-region in response to receiving the third drag input, and, in response to receiving an input for selecting a third executable object from among at least one executable object included in the list excluding the first executable object and the second executable object, maintain the display of the first screen in the first sub-region and the display of the reduced execution screen in the second sub-region, and switch the another execution screen displayed below the reduced execution screen to an execution screen of an application indicated by the third executable object. In certain embodiments, the second drag input and the third drag input is away from an edge of the first region corresponding to the edge region.

In various embodiments, the at least one processor may be further configured, when executing the instructions, to receive a second drag input from the edge region in the first region toward another region in the first region, which is different from the edge region, while displaying the first screen in the first sub-region and the execution screen in the second sub-region, display the list excluding the first executable object as partially superimposed on the execution screen displayed in the second sub-region in response to receiving the second drag input, and, in response to reception of a second user input for moving a second executable object held by a first user input, among at least one executable object included in the list excluding the first executable object, to the first sub-region, maintain the display of the execution screen in the second sub-region and switch the first screen displayed in the first sub-region to another execution screen of another application indicated by the second executable object. In certain embodiments, the second drag input is away from an edge of the first region corresponding to the edge region.

In various embodiments, the at least one processor may be further configured, when executing the instructions, to receive a second drag input from the edge region in the first region toward another region in the first region, which is different from the edge region, while displaying the first screen in the first sub-region and the execution screen in the second sub-region, display the list excluding the first executable object as partially superimposed on the execution screen displayed in the second sub-region in response to receiving the second drag input, and, in response to reception of a second user input for moving a second executable object held by a first user input, among at least one executable object included in the list excluding the first executable object, to the second sub-region, maintain the display of the first screen in the first sub-region and switch the execution screen displayed in the second sub-region to another execution screen of another application indicated by the second executable object. In certain embodiments, the second drag input is away from an edge of the first region corresponding to the edge region.

In various embodiments, the at least one processor may be further configured, when executing the instructions, to receive a second drag input from the edge region in the first region toward another region in the first region, which is different from the edge region, while displaying the first screen in the first sub-region and the execution screen in the second sub-region, display the list excluding the first executable object as partially superimposed on the execution screen displayed in the second sub-region in response to receiving the second drag input, and, in response to reception of a second user input for moving a second executable object held by a first user input, among at least one executable object included in the list excluding the first executable object, to a specified region including a boundary between the first sub-region and the second sub-region, display another execution screen of another application indicated to by the second executable object as partially superimposed on the first screen displayed in the first sub-region and the execution screen displayed in the second sub-region. In certain embodiments, the second drag input is away from an edge of the first region corresponding to the edge region.

In various embodiments, the at least one processor may be further configured, when executing the instructions, to receive a second drag input from the edge region in the first region toward another region in the first region, which is different from the edge region, while displaying the first screen in the first sub-region and the execution screen in the second sub-region, display the list excluding the first executable object as partially superimposed on the execution screen displayed in the second sub-region in response to receiving the second drag input, and, in response to reception of a second user input for reinserting a second executable object held by a first user input, among at least one executable object included in the list excluding the first executable object, into the list excluding the first executable object, maintain the display of the first screen in the first sub-region and the display of the execution screen in the second sub-region and reinsert the second executable object into the list. In certain embodiments, the second drag input is away from an edge of the first region corresponding to the edge region.

In various embodiments, the at least one processor may be further configured, when executing the instructions, to receive an input for displaying another list including at least one other executable object for indicating some of the applications that have been executed in the first sub-region while displaying the first screen in the first sub-region and the execution screen in the second sub-region, wherein the at least one other executable object included in the another list includes an executable object for indicating an application providing the first screen, in response to receiving the input for displaying the another list, maintain the display of the execution screen in the second sub-region and switch the first screen displayed in the first sub-region to the another list, and, in response to reception of a second user input for moving a second executable object held by a first user input, among at least one other executable object included in the another list, to the second sub-region, display the another list excluding the second executable object in the first sub-region and display an execution screen of an application indicated by the second executable object in the second sub-region. In various embodiments, the execution screen of the application indicated by the second executable object may be displayed in the second sub-region together with the execution screen displayed in the second sub-region before receiving the first user input and the second user input. In various embodiments, the execution screen of the application indicated by the second executable object may be displayed below the execution screen displayed in the second sub-region before receiving the first user input and the second user input.

In various embodiments, the execution screen of the application indicated by the second executable object may be switched from the execution screen displayed in the second sub-region before receiving the first user input and the second user input.

In various embodiments, the at least one processor may be further configured, when executing the instructions, to receive a second drag input to the list while displaying the list as partially superimposed on the first screen in response to receiving the first drag input, and, in response to receiving the second drag input, exclude at least some of the at least one executable object from the list and insert at least one other executable object for indicating others of the applications that have been executed in the second sub-region into the list.

In various embodiments, the at least one processor may be configured, when executing the instructions, to identify some of the applications that have been executed in the second sub-region in response to receiving the first drag input, based on execution heuristics including an operation history of the second sub-region, and, based on the identification, display the list including the at least one executable object for indicating some of the applications.

In various embodiments, the at least one processor may be configured, when executing the instructions, to identify at least one application that is interoperable with an application providing the first screen and has been executed in the second sub-region as some of the applications that have been executed in the second sub-region in response to receiving the first drag input, and, based on the identification, display the list including the at least one executable object for indicating some of the applications.

In various embodiments, the at least one processor may be configured, when executing the instructions, to identify whether or not the first screen is displayable in the first sub-region in response to receiving the input for selecting the first executable object from among the at least one executable object included in the list, based on identifying that the first screen is displayable in the first sub-region, display the first screen in the first sub-region and display the execution screen of the application in the second sub-region, and, based on identifying that the first screen is not displayable in the first sub-region, display the execution screen of the application as partially superimposed on the first screen displayed in the first region.

Figure 8:
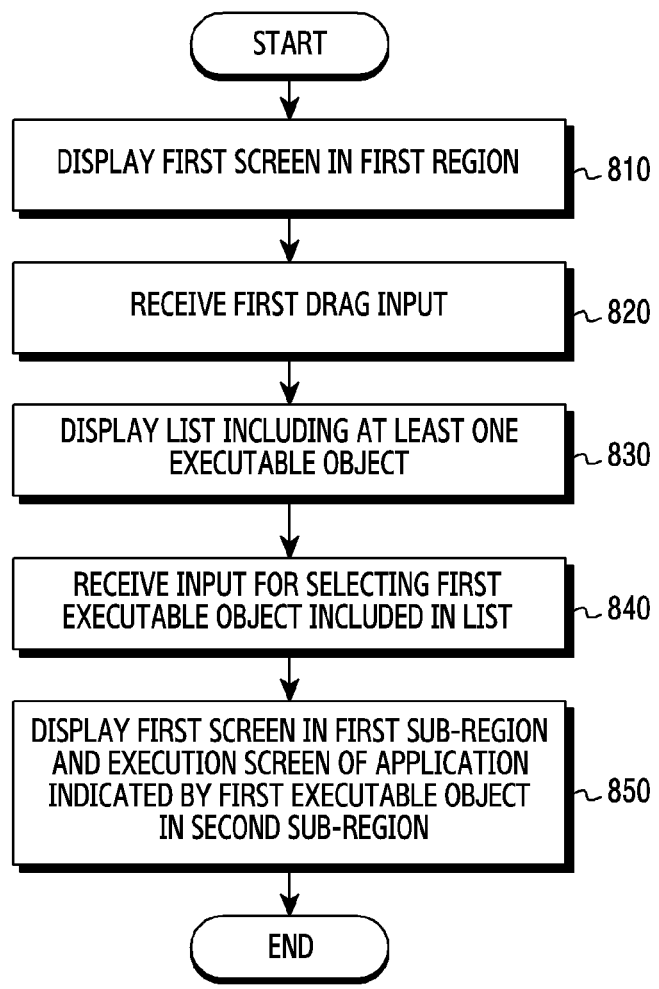
FIG. 8 is a flowchart illustrating a method of providing a split screen according to various embodiments.

FIG. 8 is a flowchart illustrating a method of providing a split screen according to various embodiments. This method may be executed by the electronic device 101 shown in FIG. 1A or the processor 150 of the electronic device 101.

Referring to FIG. 8, in operation 810, the processor 150 may display a first screen in a first region. For example, the processor 150 may display the first screen in the first region including a first sub-region and a second sub-region beside the first sub-region while the display 140 is in the unfolded state. In various embodiments, the first screen may indicate a screen provided in a full screen mode. In various embodiments, the first screen may be a home screen (or wallpaper), or may be a screen provided from an application installed in the electronic device 101.

In operation 820, while displaying the first screen in the first region, the processor 150 may receive a first drag input from an edge region in the first region toward another region in the first region, which is different from the edge region. In certain embodiments, the first drag input is away from an edge of the first region corresponding to the edge region.

In operation 830, in response to receiving the first drag input, the processor 150 may display a list including at least one executable object for indicating some of the applications that have been executed in the second sub-region as partially superimposed on the first screen displayed in the first region. For example, in response to receiving the first drag input, the processor 150 may retrieve the execution history of the applications that have been executed in the second sub-region using a framework of the electronic device 101 and acquire execution time information of the applications, based on the retrieved execution history. In response to the acquisition, the processor 150 may sort the applications, based on the execution time information. For example, the processor 150 may select the most recently executed applications, based on the sorting. Since the list is able to display a limited number of executable objects due to space constraints, the processor 150 may identify executable objects for indicating the selected applications and executable objects for indicating the top N applications, which are identified in alphabetical order, as at least one executable object to be included in the list using the framework. The processor 150 may obtain the list including the at least one identified executable object and display the obtained list as partially superimposed on the first screen.

In operation 840, the processor 150 may receive an input for selecting a first executable object from among the at least one executable object included in the list. For example, the input may be touching the first executable object with a depression strength less than a reference magnitude. As another example, the input may be touching the first executable object for a time shorter than a reference time. However, it is not limited thereto.

In operation 850, in response to receiving the input, the processor 150 may display the first screen in the first sub-region and an execution screen of an application indicated by the first executable object in the second sub-region. For example, in response to receiving the input, the processor 150 may request the application providing the first screen to provide a reduced first screen using a framework. The processor 150 may obtain information on the reduced first screen from the application providing the first screen in response to the request. Meanwhile, in response to receiving the input, the processor 150 may request information on the execution screen to be displayed in the second sub-region from the application indicated by the first executable object using the framework. The processor 150 may obtain information on the execution screen from the application indicated by the first executable object in response to the request. Based on the information on the reduced first screen and the information on the execution screen, the processor 150 may display the first screen in the first sub-region and the execution screen in the second sub-region. According to embodiments, in response to displaying the list, the processor 150 may request in advance information on the execution screen to be displayed in the second sub-region from each of at least one application indicated by the at least one executable object included in the list and obtain the information on the execution screen to be displayed in the second sub-region from each of the at least one application before receiving the input for selecting the first executable object. In response to receiving the input for selecting the first executable object, the processor 150 may obtain information on the execution screen of the application indicated by the first executable object from the obtained information. Through these operations, the electronic device 101 according to various embodiments is able to display the first screen in the first sub-region and the execution screen in the second sub-region at a high response speed.

In various embodiments, arrangement of the contents included in the reduced first screen may be different from the arrangement of the contents included in the first screen that has been displayed in the first region. For example, the distance between contents included in the reduced first screen may be less than the distance between contents included in the first screen that has been displayed in the first region. As another example, at least some of the contents included in the reduced first screen may provide simplified information compared to at least some of the contents included in the first screen that has been displayed in the first region. By providing the simplified information, the arrangement of the contents included in the reduced first screen may be different from the arrangement of the contents included in the first screen that has been displayed in the first region.

As described above, the electronic device 101 according to various embodiments may provide a list for selecting an application to be provided in the split screen state, based on a drag input from an edge region toward another region. Since the drag input is intuitive and since the list guides easy selection for an execution screen of an application to be further displayed in the split screen state, the electronic device 101 according to various embodiments is able to provide an enhanced user experience.

Figure 9:
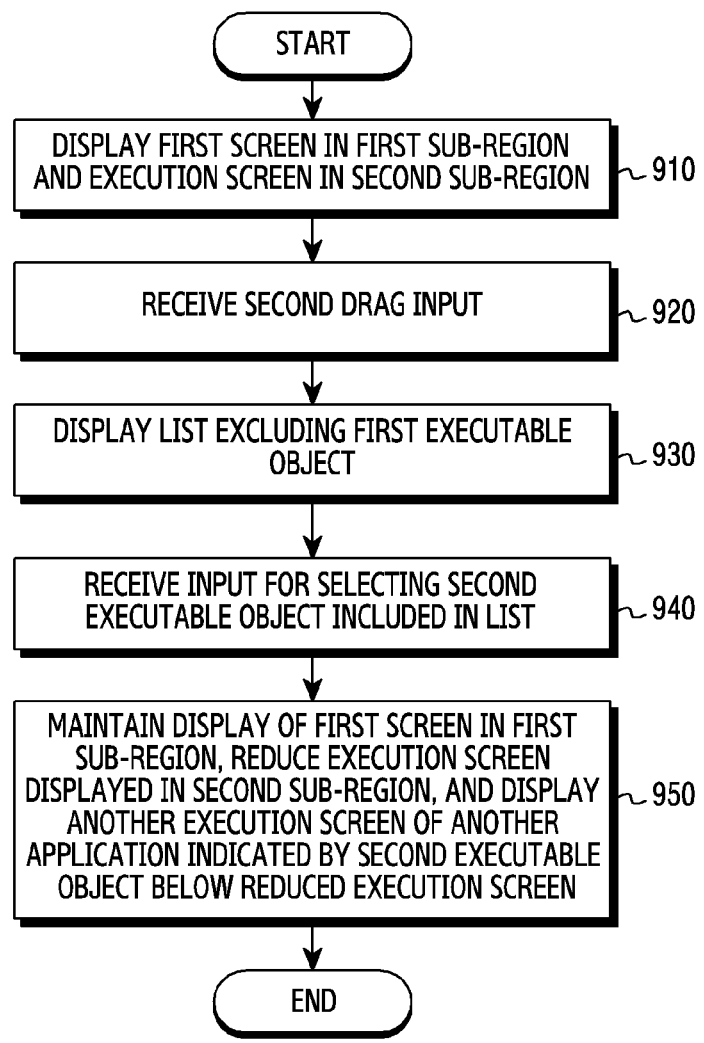
FIG. 9 is a flowchart illustrating a method of adding a screen in a split screen state according to various embodiments.

FIG. 9 is a flowchart illustrating a method of adding a screen in a split screen state according to various embodiments. This method may be executed by the electronic device 101 shown in FIG. 1A or the processor 150 of the electronic device 101.

Referring to FIG. 9, in operation 910, the processor 150 may display a first screen in a first sub-region and an execution screen in a second sub-region. For example, operation 910 may correspond to operation 850 in FIG. 8.

In operation 920, while displaying the first screen in the first sub-region and the execution screen in the second sub-region, the processor 150 may receive a second drag input from the edge region in the first region (e.g., an edge region in the second sub-region) toward another region in the first region (e.g., another region in the second sub-region), which is distinct from the edge region.

In operation 930, in response to receiving the second drag input, the processor 150 may display the list excluding the first executable object as partially superimposed on the execution screen displayed in the second sub-region. Since the first executable object indicates the application providing the execution screen displayed in the second sub-region, the processor 150 may display the list excluding the first executable object in response to receiving the second drag input. In various embodiments, in the case where the application indicated by the first executable object supports multitasking, the processor 150 may maintain the first executable object in the list.

In operation 940, the processor 150 may receive an input for selecting a second executable object from among at least one executable object included in the list excluding the first executable object.

In operation 950, in response to receiving the input for selecting the second executable object, the processor 150 may maintain the display of the first screen in the first sub-region, reduce the execution screen displayed in the second sub-region, and display another execution screen of another application indicated by the second executable object below the reduced execution screen. For example, in response to receiving the input for selecting the second executable object, the processor 150 may request information on the execution screen to be displayed in a portion of the second sub-region from the application providing the execution screen displayed in the second sub-region and obtain the information on the execution screen to be displayed in the portion of the second sub-region from the application in response to the request. In response to receiving the input for selecting the second executable object, the processor 150 may request information on the another execution screen to be displayed in the remaining portion of the second sub-region from the another application and obtain the information on the another execution screen in response to the request. Based on the information on the execution screen and the information on the another execution screen, the processor 150 may reduce the execution screen displayed in the second sub-region and display the another execution screen below the reduced execution screen. According to embodiments, in response to receiving the input for selecting the second executable object, the processor 150 may obtain information on the reduced execution screen to be displayed in a portion of the second sub-region by hiding some of the information provided from the execution screen displayed in the second sub-region using the framework without requesting the information on the execution screen to be displayed in the portion of the second sub-region from the application providing the execution screen in the second sub-region.

As described above, the electronic device 101 according to various embodiments, based on receiving a drag input from an edge region toward another region while providing two screens in the split screen state, may provide a list for selecting an application providing a screen to be added in the split screen state. Since the drag input is intuitive and since the list guides easy selection of a screen to be added in the split screen state, the electronic device 101 according to various embodiments is able to provide an enhanced user experience.

Figure 10:
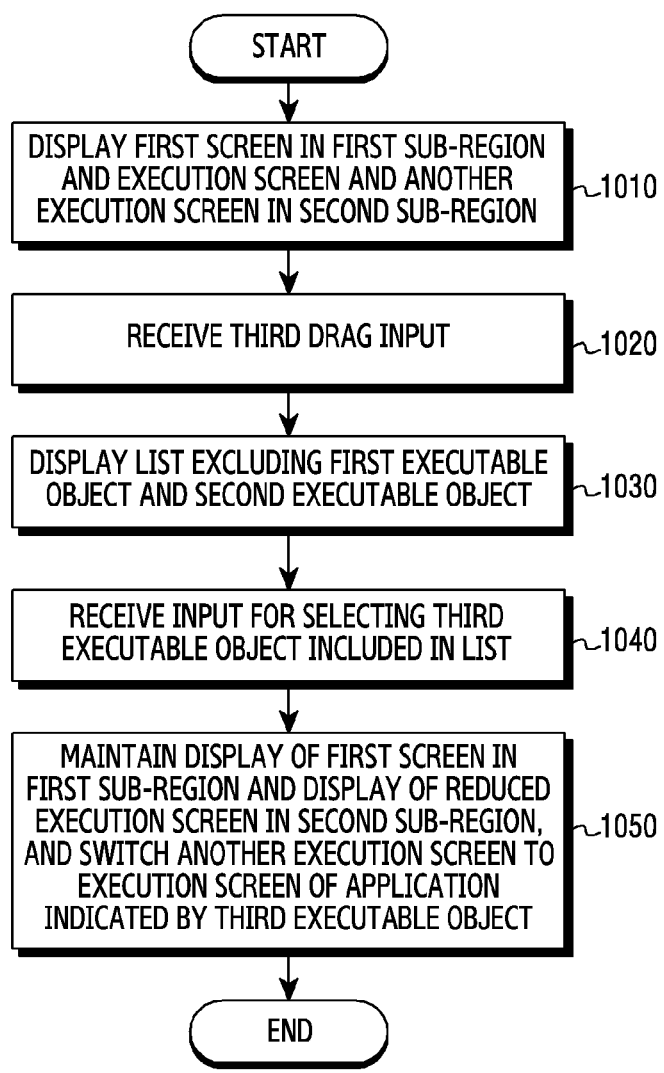
FIG. 10 is a flowchart illustrating a method of switching some of the screens provided in a split screen state according to various embodiments.

FIG. 10 is a flowchart illustrating a method of switching some of the screens provided in a split screen state according to various embodiments. This method may be executed by the electronic device 101 shown in FIG. 1A or the processor 150 of the electronic device 101.

Referring to FIG. 10, in operation 1010, the processor 150 may display the first screen in the first sub-region, and the reduced execution screen and the another execution screen in the second sub-region. For example, operation 1010 may correspond to operation 950 in FIG. 9.

In operation 1020, while displaying the first screen in the first sub-region, and the reduced execution screen and the another execution screen in the second sub-region, the processor 150 may receive a third drag input from the edge region in the first region toward another region in the first region, which is distinguished from the edge region.

In operation 1030, in response to receiving the third drag input, the processor 150 may display the list excluding the first executable object and the second executable object as partially superimposed on the execution screen and the another execution screen displayed in the second sub-region. In various embodiments, at least one of the first executable object or the second executable object may be maintained in the list in the case where at least one of the application indicated by the first executable object or the another application indicated by the second executable object supports multi-tasking.

In operation 1040, the processor 150 may receive an input for selecting a third executable object included in the list.

In operation 1050, in response to receiving the input for selecting the third executable object, the processor 150 may maintain the display of the first screen in the first sub-region and the display of the reduced execution screen in the second sub-region, and switch the another execution screen displayed below the reduced execution screen to an execution screen of an application indicated by the third executable object. For example, in response to receiving the input for selecting the third executable object, the processor 150 may request information on the execution screen to be displayed in the lower portion in the second sub-region from the application indicated by the third executable object, and, in response to the request, obtain the information on the execution screen to be displayed in the lower portion in the second sub-region from the application indicated by the third executable object. The processor 150, based on the obtained information, may maintain the display of the first screen in the first sub-region and the display of the reduced execution screen in the second sub-region, and switch the another execution screen displayed below the reduced execution screen to an execution screen of an application indicated by the third executable object.

As described above, the electronic device 101 according to various embodiments, based on receiving a drag input from an edge region toward another region while providing three screens in the split screen state, may provide a list for changing some of the processor 150 guides easy selection of a screen to be switched in the split screen state, the electronic device 101 according to various embodiments is able to provide an enhanced user experience.

Figure 11:
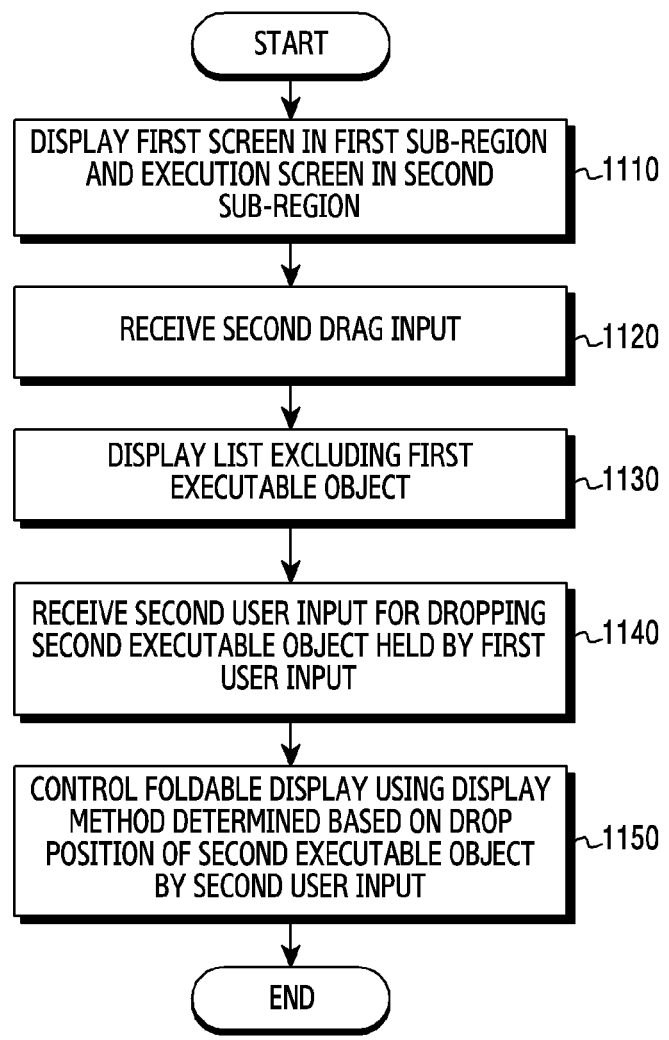
FIG. 11 is a flowchart illustrating a method of determining a display method based on a drop position of an executable object according to various embodiments.

FIG. 11 is a flowchart illustrating a method of determining a display method, based on a drop position of an executable object according to various embodiments. This method may be executed by the electronic device 101 shown in FIG. 1A or the processor 150 of the electronic device 101.

Referring to FIG. 11, in operation 1110, the processor 150 may display the first screen in the first sub-region and the execution screen in the second sub-region. For example, operation 1110 in FIG. 11 may correspond to operation 850 in FIG. 8.

In operation 1120, while displaying the first screen in the first sub-region and the execution screen in the second sub-region, the processor 150 may receive a second drag input from the edge region in the first region toward another region in the first region, which is different from the edge region. In certain embodiments, the second drag input is away from an edge of the first region corresponding to the edge region. For example, operation 1120 in FIG. 11 may correspond to operation 920 in FIG. 9.

In operation 1130, in response to receiving the second drag input, the processor 150 may display the list excluding the first executable object as partially superimposed on the execution screen displayed in the second sub-region. For example, operation 1130 in FIG. 11 may correspond to operation 930 in FIG. 9.

In operation 1140, the processor 150 may receive a second user input for dropping a second executable object held by a first user input, among at least one executable object included in the list excluding the first executable object. For example, the first user input may be touching the second executable object with a depression strength greater than or equal to a reference magnitude or touching the second executable object for a time greater than or equal to a reference time. For example, the second user input may be dragging the second executable object held by the first user input and then releasing the same.

In operation 1150, in response to receiving the second user input, the processor 150 may control the foldable display 140 using a display method determined based on the drop position of the second executable object by the second user input. For example, when the second executable object is dropped onto the first sub-region by the second user input, the processor 150 may display an execution screen of an application indicated by the second executable object in the first sub-region. As another example, when the second executable object is dropped onto the second sub-region by the second user input, the processor 150 may display an execution screen of an application indicated by the second executable object in the second sub-region. As another example, when the second executable object is dropped onto a specified region including a boundary between the first sub-region and the second region by the second user input, the processor 150 may display an execution screen of an application indicated by the second executable object as partially superimposed on the first screen displayed in the first sub-region and the execution screen displayed in the second sub-region. As another example, when the second executable object is reinserted into the list by the second user input, the processor 150 may maintain the first screen displayed in the first sub-region and the execution screen displayed in the second sub-region, and reinsert the second executable object into the list.

As described above, the electronic device 101 according to various embodiments may drag and drop the executable object, based on at least one input of another property that is distinct from the property of the input for selecting the executable object from the list, thereby guiding intuitive selection for the layout of a newly provided screen in the split screen state. In other words, the electronic device 101 according to various embodiments is able to provide an enhanced user experience.

Figure 12:
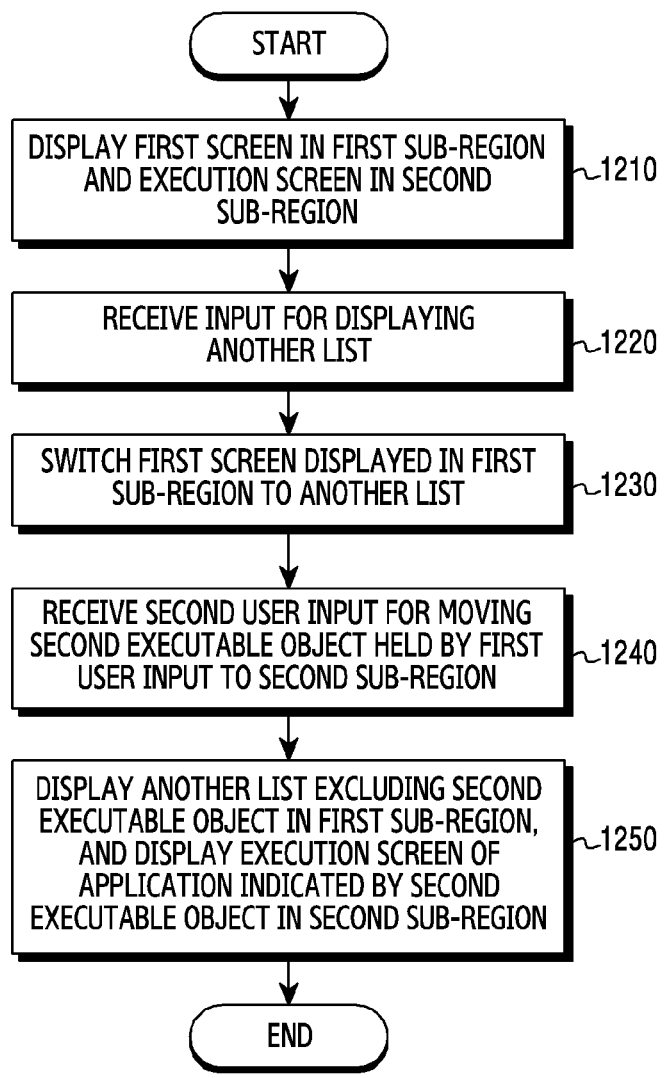
FIG. 12 is a flowchart illustrating a method of controlling a split screen state using another list provided in a first sub-region according to various embodiments.

FIG. 12 is a flowchart illustrating a method of controlling a split screen state using another list provided in a first sub-region according to various embodiments. This method may be executed by the electronic device 101 shown in FIG. 1A or the processor 150 of the electronic device 101.

Referring to FIG. 12, in operation 1210, the processor 150 may display the first screen in the first sub-region and the execution screen in the second sub-region. For example, operation 1210 in FIG. 12 may correspond to operation 850 in FIG. 8.

In operation 1220, the processor 150 may receive an input for displaying another list while displaying the first screen in the first sub-region and the execution screen in the second sub-region.

In operation 1230, in response to receiving the input, the processor 150 may switch the first screen displayed in the first sub-region to the another list. The another list may include at least one executable object for indicating at least one application that has been executed in the first sub-region. The executable objects may include an executable object for indicating the application used to provide the first screen. Meanwhile, the processor 150 may maintain the display of the execution screen in the second sub-region independently of receiving the input.

In operation 1240, the processor 150 may receive a second user input for moving a second executable object held by a first user input, among the at least one executable object included in the another list, to the second sub-region. For example, the first user input may be touching the second executable object with a depression strength greater than or equal to a reference magnitude or touching the second executable object for a time greater than or equal to a reference time. For example, the second user input may be dragging the second executable object held by the first user input and then releasing the same.

In operation 1250, in response to receiving the second user input, the processor 150 may display the another list excluding the second executable object in the first sub-region and display an execution screen of an application indicated by the second executable object in the second sub-region.

As described above, the electronic device 101 according to various embodiments is able to provide an enhanced user experience by switching some of the screens provided in the split screen state, based on the movement of the executable object selected from another list.

Figure 13:
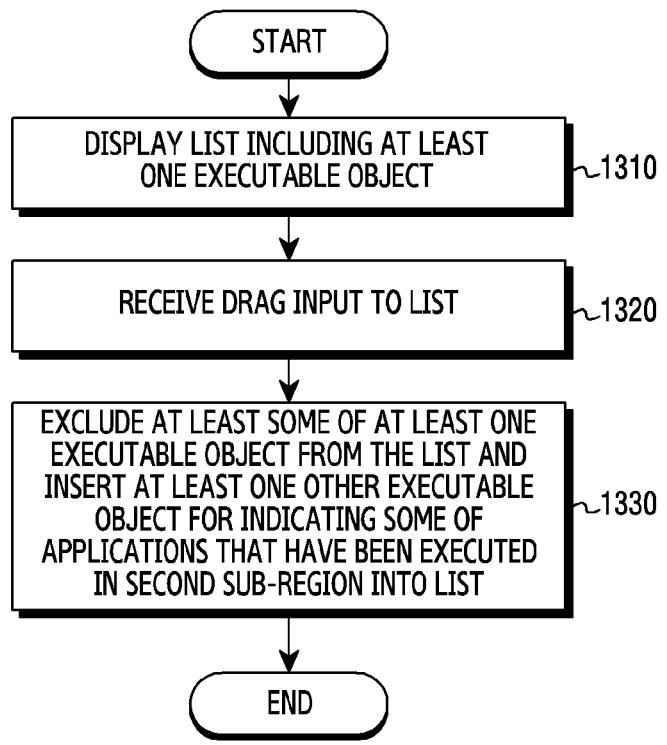
FIG. 13 is a flowchart illustrating a method of updating a list, based on a drag input to the list, according to various embodiments.

FIG. 13 is a flowchart illustrating a method of updating a list, based on a drag input to the list, according to various embodiments. This method may be executed by the electronic device 101 shown in FIG. 1A or the processor 150 of the electronic device 101.

Referring to FIG. 13, in operation 1310, the processor 150 may display a list including at least one executable object. For example, the list may include at least one executable object for indicating at least one application that has been executed in the second sub-region.

In operation 1320, the processor 150 may receive a drag input to the list. For example, the drag input may indicate an input for scrolling at least one executable object in the list.

In operation 1330, in response to receiving the drag input to the list, the processor 150 may exclude at least some of the at least one executable object from the list and insert at least one other executable object for indicating some of the other applications that have been executed in the second sub-region into the list. In other words, in response to receiving the drag input to the list, the processor 150 may provide the at least one other executable object indicating at least one other application having a lower priority than at least one application indicated by the at least one executable object in the list.

As described above, the electronic device 101 according to various embodiments may provide a scroll function to the list, thereby guiding selection of a screen to be added through a simplified interaction in the split screen state. In other words, the electronic device 101 according to various embodiments is able to provide an enhanced user experience.

Figure 14:
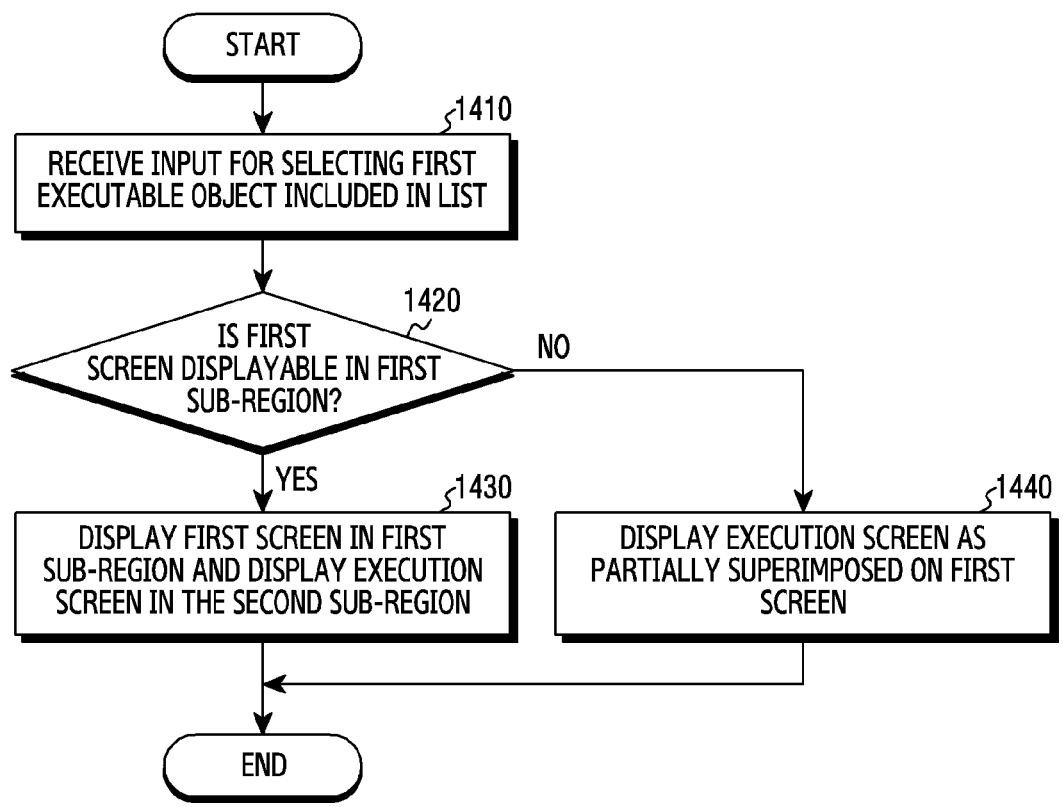
FIG. 14 is a flowchart illustrating a method of determining the state of an execution screen to be displayed together with a screen displayed in a first region according to various embodiments.

FIG. 14 is a flowchart illustrating a method of determining the state of an execution screen to be displayed together with a screen displayed in a first region according to various embodiments. This method may be executed by the electronic device 101 shown in FIG. 1A or the processor 150 of the electronic device 101.

Referring to FIG. 14, in operation 1410, the processor 150 may receive an input for selecting a first executable object included in the list. For example, based on the first drag input received while displaying the first screen in the first region, the processor 150 may display the list as partially superimposed on the first screen and receive an input for selecting the first executable object included in the list.

In operation 1420, in response to receiving the input for selecting the first executable object, the processor 150 may identify whether or not the first screen is displayable in the first sub-region. For example, in response to receiving the input for selecting the first executable object, the processor 150 may identify whether or not an application providing the first screen provides a partial screen mode. For example, based on the information stored in the memory 160 when the application providing the first screen is installed, the processor 150 may identify whether or not the application providing the first screen provides a partial screen mode. As another example, the processor 150 may inquire of the application providing the first screen about whether or not to provide a screen on which the application is to be displayed in a partial screen mode (e.g., to be displayed in the first sub-region) and, based on a response to the inquiry, identify whether or not the application provides the partial screen mode. Based on identifying whether or not the application provides the partial screen mode, the processor 150 may identify whether or not the first screen is displayable in the first sub-region. In various embodiments, when it is identified that the first screen is displayable in the first sub-region, the processor 150 may perform operation 1430, and otherwise, perform operation 1440.

In operation 1430, based on identifying that the first screen is displayable in the first sub-region, the processor 150 may display the first screen in the first sub-region and display an execution screen of an application indicated by the first executable object in the second sub-region.

In operation 1440, based on identifying that the first screen is not displayable in the first sub-region, the processor 150 may maintain the display of the first screen in the first region and display the execution screen as partially superimposed on the first screen.

As described above, the electronic device 101 according to various embodiments may determine a display method of another application that is distinguished from the application according to whether or not the application providing the first screen supports a partial screen mode, thereby providing an enhanced user experience.

As described above, a method executed in an electronic device having a foldable display according to various embodiments may include displaying a first screen in a first region of the foldable display including a first sub-region and a second sub-region beside the first sub-region while the foldable display is in an unfolded state, receiving a first drag input from an edge region in the first region away from an edge in the first region that corresponds to the edge region while displaying the first screen in the first region, displaying a list partially superimposed on the first screen displayed in the first region in response to receiving the first drag input, the list including at least one executable object for indicating some of the applications that have been executed in the second sub-region, and, in response to receiving an input for selecting a first executable object from among the at least one executable object included in the list, displaying an execution screen of an application indicated by the selected first executable object in the second sub-region, wherein the area of the first sub-region may be greater than the area of the second sub-region.

As described above, a non-transitory computer-readable storage medium according to various embodiments may store one or more programs including instructions that cause, when executed by one or more processors of an electronic device having a foldable display, the electronic device to display a first screen in a first region of the foldable display including a first sub-region and a second sub-region beside the first sub-region while the foldable display is in an unfolded state, receive a first drag input from an edge region in the first region away from an edge in the first region corresponding to the edge region while displaying the first screen in the first region, display a list partially superimposed on the first screen displayed in the first region, in response to receiving the first drag input, the list including at least one executable object for indicating some of the applications that have been executed in the second sub-region, and, in response to receiving an input for selecting a first executable object from among the at least one executable object included in the list, display the first screen in the first sub-region and display an execution screen of an application indicated by the selected first executable object in the second sub-region.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access a device that performs an embodiment of the disclosure via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
at least one memory configured to store instructions;
a foldable display; and
at least one processor operably coupled with the foldable display and the at least one memory,
wherein the at least one processor is configured, when executing the instructions, to:
display a first screen in a first region of the foldable display, the first screen comprising a first sub-region and a second sub-region adjacent to the first sub-region while the foldable display is in an unfolded state;

receive a first drag input from an edge region in the first region away from an edge in the first region that corresponds to the edge region while displaying the first screen in the first region;

in response to receiving the first drag input, display a list partially superimposed on the first screen displayed in the first region, and comprising at least one executable object for indicating some applications that have been executed in the second sub-region, the at least one executable object being displayed from top to bottom of the list in order of highest relevance to the first screen and the applications corresponding to the at least one executable object;

in response to receiving a first input for selecting a first executable object from among the at least one executable object included in the list, display the first screen in the first sub-region and display an execution screen of an application indicated by the selected first executable object in the second sub-region;

detect an event for displaying notification message while displaying the first screen in the first sub-region and the execution screen of the application indicated by the selected first executable object in the second sub-region;

in response to detecting the event, display the notification message as partially superimposed on the first screen and the execution screen; and in response to receiving a second input to the notification message, determine a screen to be displayed in the first sub-region and the second sub-region based on the second input to the notification message, comprising of:

displaying another execution screen of an application providing the notification message in the first region, if the second input is touching the notification message for a time less than a reference time;

displaying the other execution screen of the application providing the notification message in the first sub-region and maintaining the display of the execution screen in the second sub-region, if the second input is holding and moving the notification message to the first sub-region; and displaying the other execution screen of the application providing the notification message in the second sub-region and maintaining the display of the first screen in the first sub-region, if the second input is holding and moving the notification message to the second sub-region, and wherein an area of the first sub-region is greater than an area of the second sub-region.

2. The electronic device of claim 1, wherein the at least one processor is further configured, when executing the instructions, to:

receive a second drag input from the edge region in the first region away from the edge in the first region corresponding to the edge region while displaying the first screen in the first sub-region and the execution screen in the second sub-region;

in response to receiving the second drag input, display the list, excluding the first executable object, as partially superimposed on the execution screen displayed in the second sub-region; and in response to receiving an input for selecting a second executable object from among at least one executable object included in the list excluding the first executable object:

maintain the display of the first screen in the first sub-region, reduce the execution screen displayed in the second sub-region as a first execution screen, and display a second execution screen of another application indicated by the second executable object below the reduced execution screen.

3. The electronic device of claim 2, wherein the at least one processor is further configured, when executing the instructions, to:

receive a third drag input from the edge region in the first region away from the edge in the first region corresponding to the edge region while displaying the first screen in the first sub-region, and the first execution screen and a second execution screen in the second sub-region;

in response to receiving the third drag input, display the list, excluding the first executable object and the second executable object, as partially superimposed on the execution screen and the second execution screen displayed in the second sub-region; and in response to receiving an input for selecting a third executable object from among at least one executable object included in the list excluding the first executable object and the second executable object:

maintain the display of the first screen in the first sub-region and the display of the first execution screen in the second sub-region, and switch the second execution screen displayed below the first execution screen to a third execution screen of an application indicated by the third executable object.

4. The electronic device of claim 1, wherein the at least one processor is further configured, when executing the instructions, to:

receive a second drag input from the edge region in the first region away from the edge in the first region corresponding to the edge region while displaying the first screen in the first sub-region and the execution screen in the second sub-region;

in response to receiving the second drag input, display the list, excluding the first executable object, as partially superimposed on the execution screen displayed in the second sub-region; and in response to reception of a second user input for moving a second executable object held by a first user input, among at least one executable object included in the list excluding the first executable object, to the first sub-region:

maintain the display of the execution screen in the second sub-region, and switch the first screen displayed in the first sub-region to another execution screen of another application indicated by the second executable object.

5. The electronic device of claim 1, wherein the at least one processor is further configured, when executing the instructions, to:

receive a second drag input from the edge region in the first region away from an edge in the first region that corresponds to the edge region, while displaying the first screen in the first sub-region and the execution screen in the second sub-region;

in response to receiving the second drag input, display the list, excluding the first executable object, as partially superimposed on the execution screen displayed in the second sub-region; and
in response to reception of a second user input for moving a second executable object held by a first user input, among at least one executable object included in the list excluding the first executable object, to the second sub-region:
maintain the display of the first screen in the first sub-region, and
switch the execution screen displayed in the second sub-region to another execution screen of another application indicated by the second executable object.

6. The electronic device of claim 1, wherein the at least one processor is further configured, when executing the instructions, to:
receive a second drag input from the edge region in the first region away from the edge in the first region corresponding to the edge region, while displaying the first screen in the first sub-region and the execution screen in the second sub-region;
in response to receiving the second drag input, display the list, excluding the first executable object, as partially superimposed on the execution screen displayed in the second sub-region; and
in response to reception of a second user input for moving a second executable object held by a first user input, among at least one executable object included in the list excluding the first executable object, to a specified region comprising a boundary between the first sub-region and the second sub-region, display another execution screen of another application indicated to by the second executable object as partially superimposed on the first screen displayed in the first sub-region and the execution screen displayed in the second sub-region.

7. The electronic device of claim 1, wherein the at least one processor is further configured, when executing the instructions, to:
receive a second drag input from the edge region in the first region away from the edge in the first region corresponding to the edge region while displaying the first screen in the first sub-region and the execution screen in the second sub-region;
in response to receiving the second drag input, display the list, excluding the first executable object, as partially superimposed on the execution screen displayed in the second sub-region; and
in response to reception of a second user input for reinserting a second executable object held by a first user input, among at least one executable object included in the list excluding the first executable object, into the list excluding the first executable object:
maintain the display of the first screen in the first sub-region, and
the display of the execution screen in the second sub-region and reinsert the second executable object into the list.

8. The electronic device of claim 1, wherein the at least one processor is further configured, when executing the instructions, to:
receive an input for displaying a second list comprising at least one other executable object for indicating some of applications that have been executed in the first sub-region while displaying the first screen in the first sub-region and the execution screen in the second sub-region, wherein the at least one other executable object included in the second list comprises an executable object for indicating an application providing the first screen;
in response to receiving the input for displaying the second list, maintain the display of the execution screen in the second sub-region and switch the first screen displayed in the first sub-region to the second list; and
in response to reception of a second user input for moving a second executable object held by a first user input, among at least one other executable object included in the second list, to the second sub-region:
display the second list excluding the second executable object in the first sub-region, and
display an execution screen of an application indicated by the second executable object in the second sub-region.

9. The electronic device of claim 8, wherein the execution screen of the application indicated by the second executable object is displayed in the second sub-region together with the execution screen displayed in the second sub-region before receiving the first user input and the second user input.

10. The electronic device of claim 9, wherein the execution screen of the application indicated by the second executable object is switched from the execution screen displayed in the second sub-region or is displayed below the execution screen before receiving the first user input and the second user input.

11. The electronic device of claim 1, wherein the at least one processor is further configured, when executing the instructions, to:
receive a second drag input to the list while displaying the list as partially superimposed on the first screen in response to receiving the first drag input; and
in response to receiving the second drag input, exclude at least some of the at least one executable object from the list and insert at least one other executable object for indicating others of applications that have been executed in the second sub-region into the list.

12. The electronic device of claim 1, wherein the at least one processor is configured, when executing the instructions, to:
identify the some of the applications that have been executed in the second sub-region in response to receiving the first drag input, based on execution heuristics comprising an operation history of the second sub-region; and
based on identifying the some of the applications that have been executed in the second sub-region, display the list comprising the at least one executable object for indicating some of the applications.

13. The electronic device of claim 1, wherein the at least one processor is configured, when executing the instructions, to:
identify at least one application that is interoperable with an application provided in the first screen and has been executed in the second sub-region in response to receiving the first drag input; and
based on identifying the at least one application that is interoperable with the application provided in the first screen, display the list comprising the at least one executable object for indicating the at least one application that is interoperable with the application provided in the first screen.

14. The electronic device of claim 1, wherein the at least one processor is configured, when executing the instructions, to:
- identify whether or not the first screen is displayable in the first sub-region in response to the reception of the first input for selecting the first executable object from among the at least one executable object included in the list;
- based on identifying that the first screen is displayable in the first sub-region, display the first screen in the first sub-region and display the execution screen of the application in the second sub-region; and
- based on identifying that the first screen is not displayable in the first sub-region, display the execution screen of the application as partially superimposed on the first screen displayed in the first region.

15. A method executed in an electronic device having a foldable display, the method comprising:
- displaying a first screen in a first region of the foldable display, the first screen comprising a first sub-region and a second sub-region adjacent to the first sub-region while the foldable display is in an unfolded state;
- receiving a first drag input from an edge region in the first region away from an edge in the first region that corresponds to the edge region while displaying the first screen in the first region;
- in response to receiving the first drag input, displaying a list comprising at least one executable object partially superimposed on the first screen displayed in the first region, each executable object indicating an application that has been executed in the second sub-region, the at least one executable object being displayed from top to bottom of the list in order of highest relevance to the first screen and the applications corresponding to the at least one executable object;
- in response to receiving a first input for selecting a first executable object from among the at least one executable object included in the list, displaying the first screen in the first sub-region and display an execution screen of an application indicated by the selected first executable object in the second sub-region;
- detecting an event for displaying notification message while displaying the first screen in the first sub-region and the execution screen of the application indicated by the selected first executable object in the second sub-region;
- in response to detecting the event, displaying the notification message as partially superimposed on the first screen and the execution screen; and
- in response to receiving a second input to the notification message, determining a screen to be displayed in the first sub-region and the second sub-region based on the second input to the notification message, comprising of:
  - displaying another execution screen of an application providing the notification message in the first region, if the second input is touching the notification message for a time less than a reference time;
  - displaying the other execution screen of the application providing the notification message in the first sub-region and maintaining the display of the execution screen in the second sub-region, if the second input is holding and moving the notification message to the first sub-region; and
  - displaying the other execution screen of the application providing the notification message in the second sub-region and maintaining the display of the first screen in the first sub-region, if the second input is holding and moving the notification message to the second sub-region,
- wherein an area of the first sub-region is greater than an area of the second sub-region.

16. The method of claim 15, further comprising:
- receiving a second drag input from the edge region in the first region away from the edge in the first region corresponding to the edge region while displaying the first screen in the first sub-region and the execution screen in the second sub-region;
- in response to receiving the second drag input, displaying the list, excluding the first executable object, as partially superimposed on the execution screen displayed in the second sub-region; and
- in response to receiving an input for selecting a second executable object from among at least one executable object included in the list excluding the first executable object:
  - maintaining the display of the first screen in the first sub-region,
  - reducing the execution screen displayed in the second sub-region as a first execution screen, and
  - displaying a second execution screen of another application indicated by the second executable object below the reduced execution screen.

17. The method of claim 16, further comprising:
- receiving a third drag input from the edge region in the first region away from the edge in the first region corresponding to the edge region while displaying the first screen in the first sub-region, and the first execution screen and a second execution screen in the second sub-region;
- in response to receiving the third drag input, displaying the list, excluding the first executable object and the second executable object, as partially superimposed on the execution screen and the second execution screen displayed in the second sub-region; and
- in response to receiving an input for selecting a third executable object from among at least one executable object included in the list excluding the first executable object and the second executable object:
  - maintaining the display of the first screen in the first sub-region and the display of the first execution screen in the second sub-region, and
  - switching the second execution screen displayed below the first execution screen to a third execution screen of an application indicated by the third executable object.

18. The method of claim 15 further comprising:
- receiving a second drag input from the edge region in the first region away from the edge in the first region corresponding to the edge region while displaying the first screen in the first sub-region and the execution screen in the second sub-region;
- in response to receiving the second drag input, displaying the list, excluding the first executable object, as partially superimposed on the execution screen displayed in the second sub-region; and
- in response to reception of a second user input for moving a second executable object held by a first user input, among at least one executable object included in the list excluding the first executable object, to the first sub-region:
  - maintaining the display of the execution screen in the second sub-region, and switching the first screen displayed in the first sub-region to another execution screen of another application indicated by the second executable object.

19. The method of claim 15, further comprising:

receiving a second drag input from the edge region in the first region away from an edge in the first region that corresponds to the edge region, while displaying the first screen in the first sub-region and the execution screen in the second sub-region;

in response to receiving the second drag input, display the list, excluding the first executable object, as partially superimposed on the execution screen displayed in the second sub-region; and in response to reception of a second user input for moving a second executable object held by a first user input, among at least one executable object included in the list excluding the first executable object, to the second sub-region:

maintaining the display of the first screen in the first sub-region, and switching the execution screen displayed in the second sub-region to another execution screen of another application indicated by the second executable object.

20. The method of claim 15, further comprising:

receiving a second drag input from the edge region in the first region away from the edge in the first region corresponding to the edge region, while displaying the first screen in the first sub-region and the execution screen in the second sub-region;

in response to receiving the second drag input, displaying the list, excluding the first executable object, as partially superimposed on the execution screen displayed in the second sub-region; and in response to reception of a second user input for moving a second executable object held by a first user input, among at least one executable object included in the list excluding the first executable object, to a specified region comprising a boundary between the first sub-region and the second sub-region displaying another execution screen of another application indicated to by the second executable object as partially superimposed on the first screen displayed in the first sub-region and the execution screen displayed in the second sub-region.

* * * * *